(12) United States Patent
Matsumori et al.

(10) Patent No.: US 8,906,474 B2
(45) Date of Patent: Dec. 9, 2014

(54) ALIGNMENT FILM, COMPOSITION FOR FORMING ALIGNMENT FILM AND LIQUID CRYSTAL DISPLAY DEVICE

(75) Inventors: Masaki Matsumori, Naka-gun (JP); Yasuo Imanishi, Katano (JP); Yasushi Tomioka, Hitachinaka (JP); Noboru Kunimatsu, Chiba (JP)

(73) Assignee: Japan Display Inc., Tokyo (JP)

( * ) Notice: Subject to any disclaimer, the term of this patent is extended or adjusted under 35 U.S.C. 154(b) by 228 days.

(21) Appl. No.: 13/253,998

(22) Filed: Oct. 6, 2011

(65) Prior Publication Data

US 2012/0088040 A1  Apr. 12, 2012

(30) Foreign Application Priority Data

Oct. 6, 2010  (JP) .................................. 2010-226346

(51) Int. Cl.
*G02F 1/1337* (2006.01)
*C08G 73/10* (2006.01)
*C08L 79/08* (2006.01)
*C08G 73/14* (2006.01)

(52) U.S. Cl.
CPC ............. *C08L 79/08* (2013.01); *C08G 73/1042* (2013.01); *C08G 73/1075* (2013.01); *C08G 73/1078* (2013.01); *C08G 73/1085* (2013.01); *C08G 73/14* (2013.01); *C08L 2205/02* (2013.01); *G02F 1/133723* (2013.01)
USPC ............................ 428/1.26; 349/123; 349/135

(58) Field of Classification Search
CPC . C08L 79/08; C08L 2205/02; C08G 73/1042; C08G 73/1075; C08G 73/1078; C08G 73/1085; C08G 73/14; G02F 1/133723
USPC ......................... 428/1.25–1.28; 349/123–136
See application file for complete search history.

(56) References Cited

U.S. PATENT DOCUMENTS

| | | | |
|---|---|---|---|
| 2002/0086120 A1* | 7/2002 | Jacob et al. | 428/1.1 |
| 2004/0031950 A1* | 2/2004 | Shimizu et al. | 252/299.4 |

(Continued)

FOREIGN PATENT DOCUMENTS

| | | |
|---|---|---|
| JP | 2007-241249 | 9/2007 |
| JP | 2009-075569 | 4/2009 |

(Continued)

OTHER PUBLICATIONS

JPO Website Machine English Translation of JP 2002-121281, Kuromatsu Hidetoshi et al., Apr. 23, 2002.*

(Continued)

*Primary Examiner* — Sophie Hon
(74) *Attorney, Agent, or Firm* — Antonelli, Terry, Stout & Kraus, LLP.

(57) ABSTRACT

Disclosed is a liquid crystal display device including: a first substrate and a second substrate, one of which is transparent; a liquid crystal layer disposed between the first substrate and the second substrate; a group of electrodes for applying an electric field to the liquid crystal layer, which is formed on one of the first substrate and the second substrate; a plurality of active elements connected to the group of electrodes; and an alignment film disposed on one of the first substrate and the second substrate, wherein the alignment film contains a polyimide and a precursor of the polyimide, each of which is formed from a diamine and an acid anhydride, and the diamine contains a first diamine having an acidic group and a second diamine having a nitrogen atom-containing functional group other than two amino groups.

14 Claims, 8 Drawing Sheets

(56) References Cited

U.S. PATENT DOCUMENTS

| | | |
|---|---|---|
| 2005/0271833 A1 | 12/2005 | Matsumori et al. |
| 2006/0061719 A1* | 3/2006 | Tomioka et al. ............... 349/123 |
| 2009/0053430 A1 | 2/2009 | Matsumori et al. |
| 2010/0063243 A1* | 3/2010 | Suzuki et al. .................. 528/322 |
| 2011/0080547 A1 | 4/2011 | Matsumori et al. |

FOREIGN PATENT DOCUMENTS

| | | | |
|---|---|---|---|
| JP | 2011-076009 | 4/2011 | |
| WO | WO 2008/013285 A1 | 1/2008 | |
| WO | WO 2009/093707 A1 | 7/2009 | |
| WO | WO 2009/093709 A1 | 7/2009 | |
| WO | WO 2009/093711 A1 | 7/2009 | |
| WO | WO 2009093707 A1 * | 7/2009 | ............ C08G 73/10 |
| WO | WO 2011/115077 A1 | 9/2011 | |

OTHER PUBLICATIONS

Google English Translation of WO 2009/093711, Goto et al., Jul. 30, 2009.*

English translation of Office Action of Chinese App. No. 201110306003.4 dated Jan. 21, 2014.

Partial translation of an Office Action for Japanese Patent Application No. 2011-220138, dated Jun. 24, 2014; 5 pages.

* cited by examiner

ALIGNMENT FILM, COMPOSITION FOR FORMING ALIGNMENT FILM AND LIQUID CRYSTAL DISPLAY DEVICE

CROSS-REFERENCE TO RELATED APPLICATION

The present application claims priority from Japanese patent application JP2010-226346 filed on Oct. 6, 2010, the content of which is hereby incorporated by reference into this application.

BACKGROUND OF THE INVENTION

1. Field of the Invention

The present invention relates to an alignment film for aligning a liquid crystal layer interposed between two substrates, a composition for forming an alignment film for forming the alignment film, and a liquid crystal display device including the alignment film.

2. Description of the Related Art

Liquid crystal display devices have good characteristics that they have a high display quality, are thin and light, consume little electric power, and so on, therefore, the application thereof has been expanded. For example, liquid crystal display devices are applied to monitors for portable goods such as monitors for cellular phones and monitors for digital still cameras, monitors for desktop personal computers, monitors for printing and designing, monitors for medical use, liquid crystal televisions, and so on. As expanding the application thereof, there have been strong demands for increasing transmittance to increase brightness, decreasing power consumption, and also decreasing cost for liquid crystal display devices.

In general, display in a liquid crystal display device is carried out by applying an electric field to liquid crystal molecules in a liquid crystal layer interposed between a pair of substrates to change the alignment direction of the liquid crystal molecules, and utilizing a change in the optical characteristics of the liquid crystal layer caused by the change of the alignment direction. The alignment direction of liquid crystal molecules when an electric field is not applied is determined by an alignment film in which the surface of a polyimide thin film is subjected to a rubbing treatment. Conventionally, in an active drive type liquid crystal display device having a switching element such as a thin-film transistor (TFT) for each pixel, an electrode is provided on each of a pair of substrates interposing a liquid crystal layer therebetween, so that the direction of an electric field to be applied to the liquid crystal layer may be substantially perpendicular to the surface of the substrate (a so-called vertical electric field), and display is carried out by utilizing the optical rotation of the liquid crystal molecules constituting the liquid crystal layer. As a representative display method adopted in a vertical electric field mode liquid crystal display device, a twisted nematic (TN) mode is known.

In a liquid crystal display device adopting this TN mode, a narrow viewing angle is one of the big problems. Accordingly, as a display mode achieving a wide viewing angle, an in-plane switching (IPS) mode or a vertical alignment (VA) mode are known.

It is known that in several types of liquid crystal display devices, if the volume specific resistance of an alignment film is high, a residual charge remains in the liquid crystal display devices to cause an afterimage (image burn-in). JP 2007-241249 A proposes that an alignment film reduces the volume specific resistance in a VA mode.

SUMMARY OF THE INVENTION

However, an alignment film to be used in a conventional liquid crystal display device has a problem that the suppression of image burn-in is not sufficient.

An object of the invention is to provide a liquid crystal display device provided with an alignment film which causes less image burn-in.

A liquid crystal display device according to the invention is a liquid crystal display device including: a first substrate and a second substrate, at least one of which is transparent; a liquid crystal layer disposed between the first substrate and the second substrate; a group of electrodes for applying an electric field to the liquid crystal layer, which is formed on at least one of the first substrate and the second substrate; a plurality of active elements connected to the group of electrodes; and an alignment film disposed on at least one of the first substrate and the second substrate, wherein the alignment film contains a polyimide and a precursor of the polyimide, each of which is formed from a diamine and an acid anhydride, and the diamine contains a first diamine having at least one acidic group and a second diamine having at least one nitrogen atom-containing functional group other than two amino groups.

Further, the first diamine may contain at least one functional group selected from a carboxylic acid group, a sulfonic acid group, a phosphoric acid group, and a phosphonic acid group as the acidic group.

Further, the nitrogen atom-containing functional group may be a basic group.

Further, the first diamine and the second diamine may be represented by the following chemical formula (1) and the chemical formula (2), respectively.

[First Diamine]

$$H_2N-X-NH_2 \quad (1)$$

In the formula (1), X is an at least divalent organic group, and contains one to three functional groups of at least one kind selected from a carboxylic acid group, a sulfonic acid group, a phosphoric acid group, and a phosphonic acid group as the acidic group in the chemical structure thereof.

[Second Diamine]

$$H_2N-Y-NH_2 \quad (2)$$

In the formula (2), Y is an at least divalent organic group, and contains one to three nitrogen atoms in the chemical structure thereof.

Further, the ratio of the number of nitrogen atoms derived from the nitrogen atom-containing functional group to the number of the acidic groups derived from the first diamine contained in the polyimide and the precursor of the polyimide constituting the alignment film may be from 0.25 to 4.0.

Further, the sum of the content rate of the first diamine and the content rate of the second diamine in the diamine to be used for forming the polyimide and the precursor of the polyimide may be 30 mol % or more. Further, the acid anhydride to be used for forming the polyimide and the precursor of the polyimide may contain an aliphatic dianhydride in an amount of 50 mol % or more.

Further, the transmittance (Y) of the alignment film may be 98.0% or more. Further, the alignment film may be imparted a liquid crystal alignment ability by irradiation with polarized ultraviolet light. Further, the precursor of the polyimide may contain a polyamide acid ester and a polyamide acid.

Further, the polyamide acid ester may be formed from a cyclobutane tetracarboxylic dianhydride derivative and an aromatic diamine. Further, the precursor of the polyimide may be a polyamide acid ester which is formed from a cyclobutane tetracarboxylic dianhydride derivative.

Further, an alignment film according to the invention is an alignment film including a polyimide and a precursor of the polyimide, each of which is formed from a diamine and an acid anhydride, wherein the diamine contains a first diamine having at least one acidic group and a second diamine having at least one nitrogen atom-containing functional group other than two amino groups.

Further, a composition for forming an alignment film according to the invention is a composition for forming an alignment film containing a polyimide and a precursor of the polyimide, and contains a first diamine having at least one acidic group, a second diamine having at least one nitrogen atom-containing functional group other than two amino groups, and an acid anhydride.

According to the invention, a liquid crystal display device provided with an alignment film which causes less image burn-in, an alignment film which causes less image burn-in, and a composition for forming an alignment film which causes less image burn-in can be provided. Other advantages of the invention will become apparent from the description of the entirety of the specification.

DETAILED DESCRIPTION OF THE INVENTION

Figure 1:
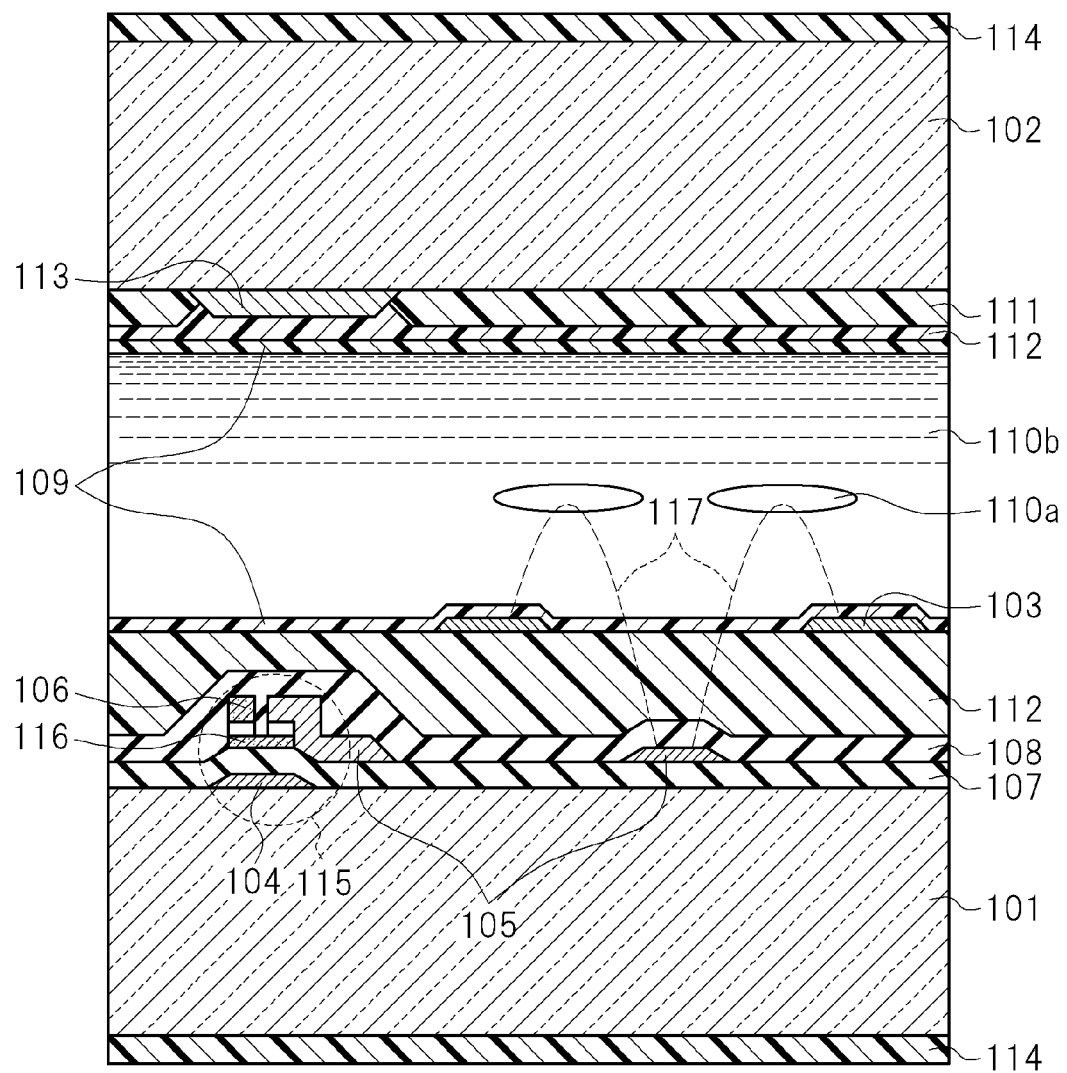
FIG. 1 is a schematic cross-sectional view of one pixel and the vicinity thereof of a liquid crystal display device according to a first embodiment.

In order to solve the problem of burn-in (also referred to as "afterimage"), a method for reducing the volume specific resistance of an alignment film (also referred to as "alignment control film") has been proposed and studied, however, as a result of intensive studies, the present inventors found the following fact. The cause of occurrence of burn-in is direct-current charge accumulated at an interface of an alignment film when a liquid crystal display device is driven, however, it is not sufficient only to reduce the volume specific resistance of the alignment film for removing this direct-current charge. The major cause of accumulation of direct-current charge is the uneven distribution of impurity ionic substances present in a liquid crystal or an alignment film, and the amounts or kinds of these impurity ions vary depending on a step of synthesizing a liquid crystal or an alignment film or a step of producing a liquid crystal display device.

As the impurity ions, positive ions, negative ions, or both positive and negative ions are present, and in order to eliminate the uneven distribution of these impurity ions, that is, in order to eliminate burn-in by utilizing the conductivity of an alignment film, the alignment film should have conductivity for both positive and negative ions (conductivity for both ions). The present inventors found that by allowing an acidic group which is a proton donor and a nitrogen atom-containing functional group which is a proton acceptor to coexist in the structure of an alignment film, conductivity for both ions can be imparted to the alignment film, and a very favorable property of preventing burn-in can be obtained. Further, the nitrogen atom-containing functional group which is a proton acceptor may be a basic group.

As the acidic group which is a proton donor, a carboxylic acid group ($—COOH$), a sulfonic acid group ($—SO_3H$), a phosphoric acid group ($—OPO_3H_2$), and a phosphonic acid group ($—PO_3H_2$) are preferred. Further, examples of the nitrogen atom-containing functional group which is a proton acceptor include an amino group, an amide group, and a hydrazine group. Further, as the nitrogen atom-containing basic functional group, an amino group or an amide group is preferred. Among the amino groups, particularly a secondary amine is preferred, and among amide groups, particularly a primary amide group and a secondary amide group, each having an intermolecular hydrogen bond forming ability, are preferred.

Incidentally, in a polyimide obtained by imidizing a polyamide acid which is usually used in an alignment film, if an imidization ratio is low, a carboxylic acid group and an amino group result in remaining as such. Meanwhile, the level of demand for a property of preventing burn-in is increasing year by year, and the density of the carboxylic acid group or the amino group remaining when the imidization ratio of the polyamide acid is low is so low that the property of preventing burn-in is insufficient and is not permitted. Further, when thermal imidization is performed at a low temperature or for a short time in order to decrease the imidization ratio, a large amount of a solvent or impurities remain in the alignment film, and a problem arises that another display failure is caused.

In the case where, for example, an amino group or an amide group is introduced into the molecular structure of the alignment film as the nitrogen atom-containing functional group which is a proton acceptor, a polymer chain may extend through a conjugated bond by oxidation or the like during heating depending on the structure to cause coloration, and a problem arises that the transmittance of the liquid crystal display device is decreased. In particular, when an amino group and a phenyl group are directly bonded to each other to form a repeating structure, coloration is significant, and therefore, this case is not preferred.

An object of the invention is to provide a liquid crystal display device provided with an alignment film which causes less image burn-in, an alignment film which causes less image burn-in, and a composition for forming an alignment film which causes less image burn-in.

A liquid crystal display device according to this embodiment is a liquid crystal display device including: a first substrate and a second substrate, at least one of which is transparent; a liquid crystal layer disposed between the first substrate and the second substrate; a group of electrodes for applying an electric field to the liquid crystal layer, which is formed on at least one of the first substrate and the second substrate; a plurality of active elements connected to the group of electrodes; and an alignment film disposed on at least one of the first substrate and the second substrate, wherein the alignment film contains a polyimide and a precursor of the polyimide, each of which is formed from a diamine and an acid anhydride, and the diamine contains a first diamine having at least one acidic group and a second diamine having at least one nitrogen atom-containing functional group other than two amino groups.

Further, the alignment film of the liquid crystal display device according to this embodiment may be composed of a polyimide and a precursor of the polyimide. Incidentally, the first substrate and the second substrate of the liquid crystal display device according to this embodiment constitute a pair of substrates. Accordingly, in this specification, the first substrate and the second substrate are sometimes collectively referred to as "a pair of substrates".

Further, the alignment film of the liquid crystal display device according to this embodiment is an alignment film containing a polyimide and a precursor of the polyimide, each of which is formed from a diamine and an acid anhydride, wherein the diamine contains a first diamine having at least one acidic group and a second diamine having at least one nitrogen atom-containing functional group other than two amino groups. Further, the alignment film of the liquid crystal display device according to this embodiment may be composed of a polyimide and a precursor of the polyimide. Further, the nitrogen atom-containing functional group may be a basic group. That is, the alignment film of the liquid crystal display device according to this embodiment may contain an acidic group and a nitrogen atom-containing functional group or a nitrogen atom-containing basic functional group in the chemical structure thereof.

Further, the composition for forming an alignment film according to this embodiment is a composition for forming an alignment film containing a polyimide and a precursor of the polyimide, and contains a first diamine having at least one acidic group, a second diamine having at least one nitrogen atom-containing functional group other than two amino groups, and an acid anhydride.

Further, the first diamine may contain at least one functional group selected from a carboxylic acid group, a sulfonic acid group, a phosphoric acid group, and a phosphonic acid group as the acidic group. Further, the first diamine may contain at least one functional group selected from a carboxylic acid group and a sulfonic acid group as the acidic group.

Further, the first diamine may contain only at least one functional group selected from a carboxylic acid group, a sulfonic acid group, a phosphoric acid group, and a phosphonic acid group as the acidic group. Further, the first diamine may contain only at least one functional group selected from a carboxylic acid group and a sulfonic acid group as the acidic group.

Further, the first diamine may contain at least one functional group of only one kind selected from a carboxylic acid group, a sulfonic acid group, a phosphoric acid group, and a phosphonic acid group as the acidic group. Further, the first diamine may contain at least one functional group of only one kind selected from a carboxylic acid group and a sulfonic acid group as the acidic group.

Further, the nitrogen atom-containing functional group of the second diamine may be a basic group. The nitrogen atom-containing basic functional group may have an amine structure in the chemical structure thereof. Examples of the amine structure include a primary amine, a secondary amine, a tertiary amine, an aromatic amine, and an amide group. Specific examples thereof include a monovalent functional group obtained by removing a hydrogen atom from ammonia, a primary amine, or a secondary amine such as a primary amine ($-NH_2$), a secondary amine ($-NHR^1$, wherein $R^1$ represents a monovalent organic group bonded to N), and a tertiary amine ($-NR^1R^2$, wherein $R^1$ and $R^2$ each independently represent a monovalent organic group bonded to N), and also include an amide group and a structure ($-N=$) in which a nitrogen atom is introduced in a nitrogen atom-containing cyclic compound (for example, pyridine, pyridazine, pyrimidine, pyrazine, 1,3,5-triazine, etc.). The nitrogen atom-containing basic functional group particularly preferably has a secondary amine, a primary amide group, or a secondary amide group in the chemical structure thereof.

Further, the second diamine preferably has at least one functional group selected from an amino group (for example, $-NH_2$, $-NH-$, etc.) and an amide group (for example, $-CO-NH_2$, $-CO-NH-$, etc.) as the nitrogen atom-containing basic functional group. Further, the second diamine more preferably has at least one functional group selected from an amino group having a secondary amine structure ($-NH-$), a primary amide group ($-CO-NH_2$), and a secondary amide group ($-CO-NH-$) as the nitrogen atom-containing basic functional group.

Incidentally, the amide group has a base dissociation constant (pKb) of 14, and in this specification, the amide group is included in the above-described nitrogen atom-containing basic functional group. Further, a functional group (a pyridyl group, a pyridazinyl group, etc.) obtained by removing a hydrogen atom from a nitrogen atom-containing cyclic compound (for example, pyridine, pyridazine, pyrimidine, pyrazine, 1,3,5-triazine, etc.) is also included in the nitrogen atom-containing basic functional group in the same manner.

Further, the second diamine may contain at least one kind of functional group selected from an amino group (for example, $-NH_2$, $-NH-$, etc.) and an amide group (for example, $-CO-NH_2$, $-CO-NH-$, etc.) as the nitrogen atom-containing basic functional group. Further, the second diamine more preferably contains at least one kind of functional group selected from an amino group having a secondary amine structure ($-NH-$), a primary amide group ($-CO-NH_2$), and a secondary amide group ($-CO-NH-$) as the nitrogen atom-containing basic functional group.

Further, the second diamine may contain only one kind of functional group selected from an amino group (for example, $-NH_2$, $-NH-$, etc.) and an amide group (for example, $-CO-NH_2$, $-CO-NH-$, etc.) as the nitrogen atom-containing basic functional group. Further, the second diamine more preferably contains only one kind of functional group selected from an amino group having a secondary amine structure ($-NH-$), a primary amide group ($-CO-NH_2$), and a secondary amide group ($-CO-NH-$) as the nitrogen atom-containing basic functional group.

Further, the alignment film of the liquid crystal display device according to this embodiment has a transmittance (Y)

of 98.0% or more. Further, the transmittance (Y) is preferably 98.5% or more, and more preferably 99.0% or more. The transmittance (Y) is a transmittance (%) calculated from the spectrum transmitted through the alignment film in accordance with JIS Z 8722 using C-light source as the light source.

Further, the alignment film of the liquid crystal display device according to this embodiment is imparted with a liquid crystal alignment ability by irradiation with polarized ultraviolet light. The present inventors found that by irradiating an alignment film with ultraviolet light, the volume specific resistance of the alignment film is increased. By using the alignment film according to this embodiment, the increase in the volume specific resistance of the alignment film can be suppressed even if the alignment film is irradiated with ultraviolet light, and the resulting alignment film effectively functions to prevent burn-in.

Further, the precursor of the polyimide may contain a polyamide acid ester. As a result of studies, the present inventors found that a polyamide acid ester has very high volume specific resistance. By using the alignment film according to this embodiment, the volume specific resistance of the alignment film obtained by imidizing a polyamide acid ester can be decreased, and therefore, the resulting alignment film effectively functions.

The polyamide acid ester may be obtained using a cyclobutane tetracarboxylic dianhydride derivative and an aromatic diamine as starting materials. By incorporating the polyamide acid ester formed from a cyclobutane tetracarboxylic dianhydride derivative and an aromatic diamine in the alignment film, an alignment film having high liquid crystal alignment stability at the time of irradiation with polarized ultraviolet light and also having a high transmittance can be obtained.

A specific structure of the cyclobutane tetracarboxylic dianhydride derivative is represented by the following chemical formula (C-1) as an example. However, the structure is not limited thereto.

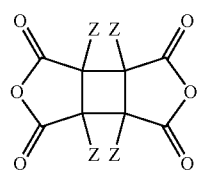

(C-1)

In the chemical formula (C-1), Z's each independently represent hydrogen or an alkyl group having 1 to 8 carbon atoms.

As described above, the polyimide and the precursor of the polyimide constituting the alignment film of the liquid crystal display device according to this embodiment contains a first diamine and a second diamine as starting materials. Examples of the precursor of the polyimide include a polyamide acid and a polyamide acid ester. As described in the following technical literature, the polyamide acid is obtained by stirring and polymerizing a diamine compound and a tetracarboxylic dianhydride (also referred to as "acid anhydride" or "acid dianhydride") in an organic solvent.

Technical Literature 1: "The Latest Polyimide" edited by Japan Polyimide Study Group, published by NTS Inc. in 2002

Specifically, a diamine compound is dissolved in a polar amide-based solvent such as NMP. When a tetracarboxylic dianhydride in a substantially equimolar amount to the diamine compound is added to this solution and the resulting mixture is stirred at room temperature, a ring-opening addition polymerization reaction between the tetracarboxylic dianhydride and the diamine compound proceeds as the tetracarboxylic dianhydride dissolves, and a high molecular weight polyamide acid is obtained. Further, in the case of a polyamide acid ester, a chlorination reagent such as thionyl chloride is allowed to react with a diester dicarboxylic acid obtained by reacting a tetracarboxylic dianhydride with an alcohol, whereby highly reactive diester dicarboxylic acid chloride is obtained. The resulting compound and a diamine compound are allowed to react with each other to effect polycondensation, whereby a polyamide acid alkyl ester is obtained.

At this time, by mixing plural kinds of starting materials of the diamine compound and the tetracarboxylic dianhydride, a copolymerized polymer in which a plurality of chemical species are polymerized in one polymer chain is obtained.

The first diamine according to this embodiment is a diamine represented by the following chemical formula (1).
[First Diamine]

(1)

In the formula (1), X is an at least divalent organic group, and contains one to three functional groups of at least one kind selected from a carboxylic acid group, a sulfonic acid group, a phosphoric acid group, and a phosphonic acid group as the acidic group in the chemical structure thereof. Further, X is an at least divalent organic group, and may contain one to three functional groups of at least one kind selected from a carboxylic acid group and a sulfonic acid group as the acidic group in the chemical structure thereof.

Further, X is an at least divalent organic group, and may contain one to three functional groups of only at least one kind selected from a carboxylic acid group, a sulfonic acid group, a phosphoric acid group, and a phosphonic acid group as the acidic group in the chemical structure thereof. Further, X is an at least divalent organic group, and may contain one to three functional groups of only at least one kind selected from a carboxylic acid group and a sulfonic acid group as the acidic group in the chemical structure thereof.

Further, X is an at least divalent organic group, and may contain one to three functional groups of only one kind selected from a carboxylic acid group, a sulfonic acid group, a phosphoric acid group, and a phosphonic acid group as the acidic group in the chemical structure thereof. Further, X is an at least divalent organic group, and may contain one to three functional groups of only one kind selected from a carboxylic acid group and a sulfonic acid group as the acidic group in the chemical structure thereof.

The second diamine according to this embodiment is a diamine represented by the following chemical formula (2).
[Second Diamine]

(2)

In the formula (2), Y is an at least divalent organic group, and contains one to three nitrogen atoms in the chemical structure thereof.

Further, Y is an at least divalent organic group, and may contain one to three nitrogen atom-containing functional groups in the chemical structure thereof. Further, Y is an at least divalent organic group, and may contain one to three nitrogen atom-containing basic functional groups in the chemical structure thereof.

Further, Y is an at least divalent organic group, and may contain one to three functional groups of at least one kind selected from an amino group (for example, $-NH_2$, —NH—, etc.) and an amide group (for example, —CO—NH₂, —CO—NH—, etc.) as the nitrogen atom-containing basic functional group in the chemical structure thereof. Further, it is more preferred that Y is an at least divalent organic group, and may contain one to three functional groups of at least one kind selected from an amino group having a secondary amine structure (—NH—), a primary amide group (—CO—NH₂), and a secondary amide group (—CO—NH—) as the nitrogen atom-containing basic functional group in the chemical structure thereof.

Further, Y is an at least divalent organic group, and may contain one to three functional groups of only one kind selected from an amino group (for example, —NH₂, —NH—, etc.) and an amide group (for example, —CO—NH₂, —CO—NH—, etc.) as the nitrogen atom-containing basic functional group in the chemical structure thereof. Further, it is more preferred that Y is an at least divalent organic group, and may contain one to three functional groups of only one kind selected from an amino group having a secondary amine structure (—NH—), a primary amide group (—CO—NH₂), and a secondary amide group (—CO—NH—) as the nitrogen atom-containing basic functional group in the chemical structure thereof.

When the polyimide and the precursor of the polyimide, each of which is formed by mixing the compound represented by the chemical formula (1) and the compound represented by the chemical formula (2) are used in the alignment film of the liquid crystal display device, image burn-in is caused less in the liquid crystal display device.

Examples of the first diamine include compounds represented by the following chemical formulae (A-1) to (A-20), however, the first diamine is not limited to these compounds.

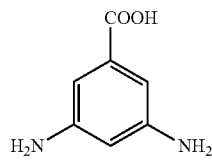
(A-1)

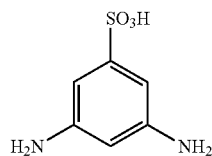
(A-2)

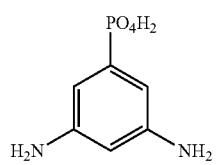
(A-3)

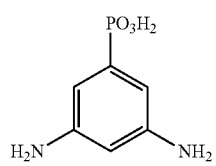
(A-4)

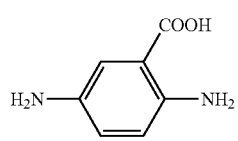
(A-5)

-continued

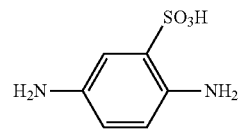
(A-6)

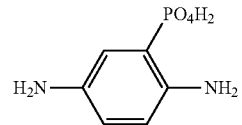
(A-7)

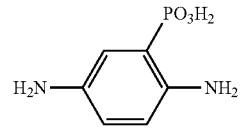
(A-8)

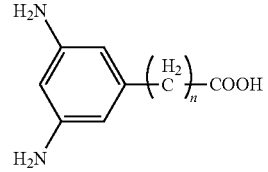
(A-9)

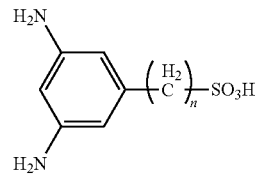
(A-10)

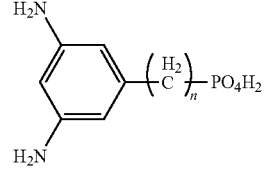
(A-11)

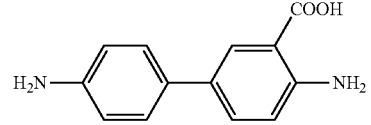
(A-12)

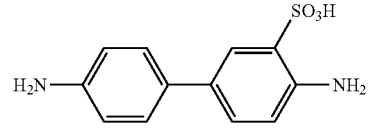
(A-13)

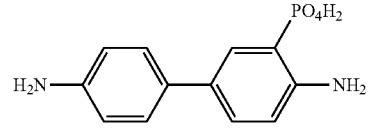
(A-14)

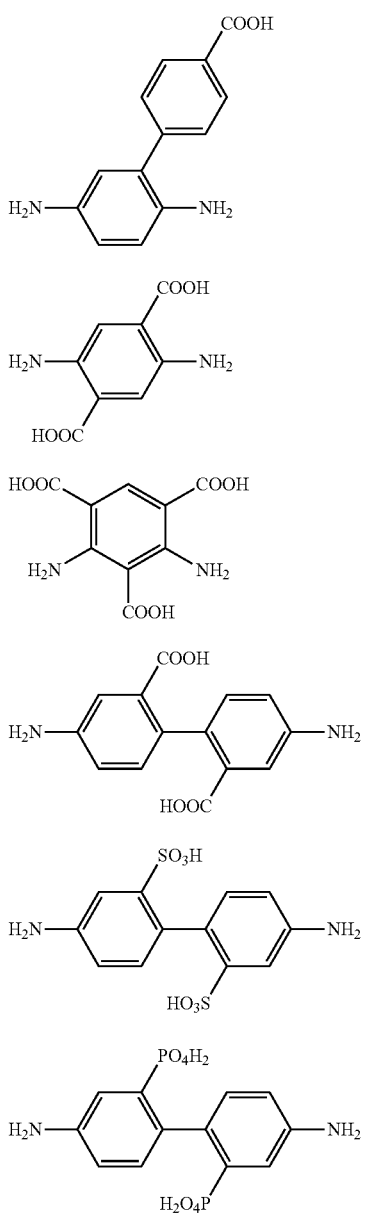
(A-15)
(A-16)
(A-17)
(A-18)
(A-19)
(A-20)
In the above chemical formulae (A-9) to (A-11), n's each independently represent an integer of 1 to 8.
Examples of the second diamine include compounds represented by the following chemical formulae (B-1) to (B-38), however, the second diamine is not limited to these compounds.
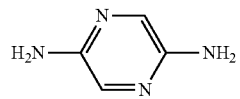
(B-1)
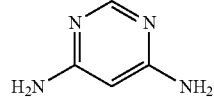
(B-2)
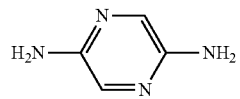
(B-3)
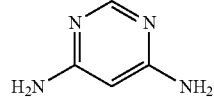
(B-4)
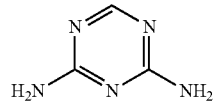
(B-5)
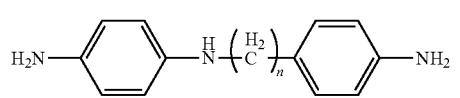
(B-6)
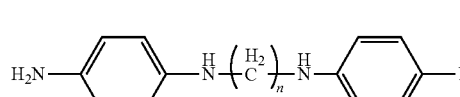
(B-7)
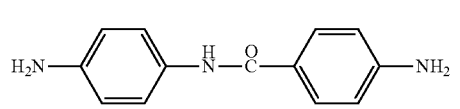
(B-8)
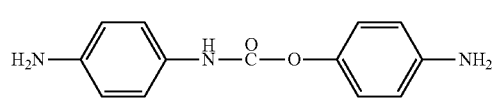
(B-9)
(B-10)
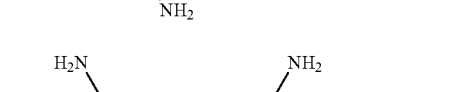
(B-11)
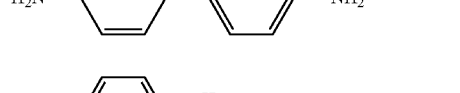
(B-12)
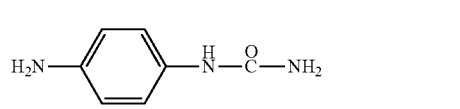
(B-13)
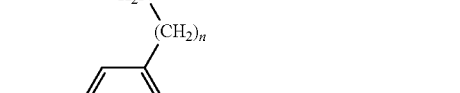
(B-14)

(B-15) 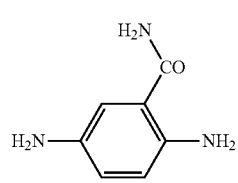
(B-16) 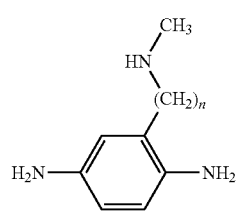
(B-17) 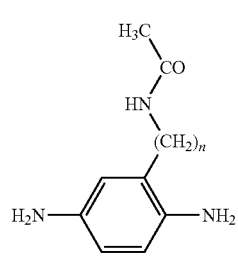
(B-18) 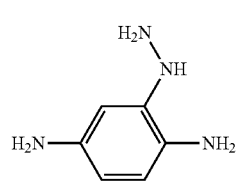
(B-19) 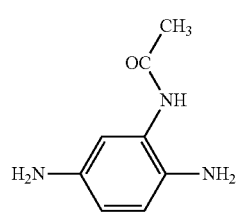
(B-20) 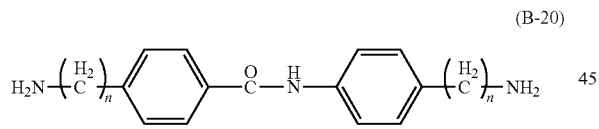
(B-21) 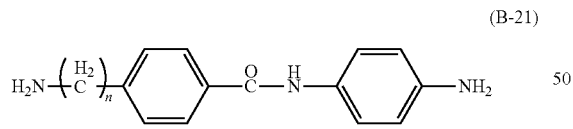
(B-22) 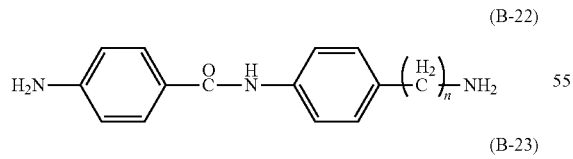
(B-23) 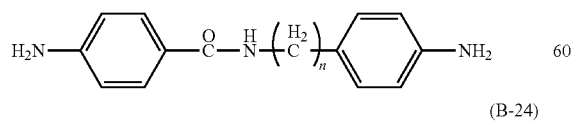
(B-24) 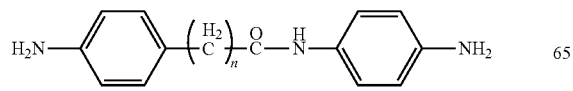
(B-25) 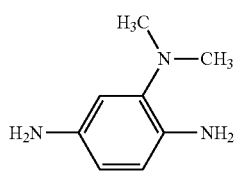
(B-26) 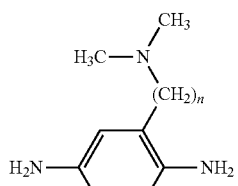
(B-27) 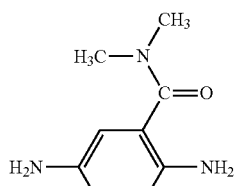
(B-28) 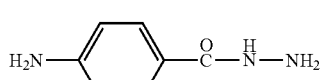
(B-29) 
(B-30) 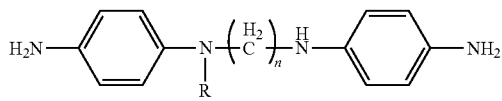
(B-31) 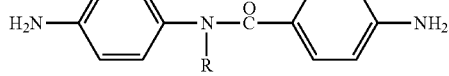
(B-32) 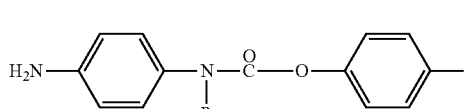
(B-33) 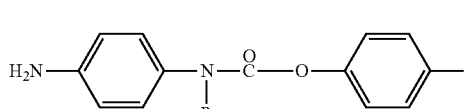
(B-34) 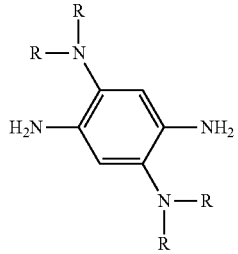

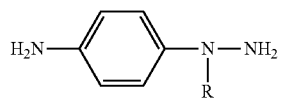
(B-35)

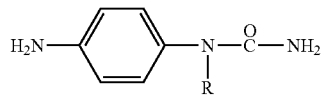
(B-36)

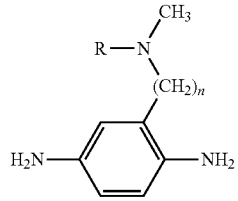
(B-37)

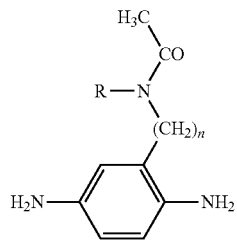
(B-38)

In the above chemical formulae (B-6), (B-7), (B-14), (B-16), (B-17), (B-20) to (B-24), (B-26), (B-29) to (B-31), (B-37) and (B-38), n's each independently may represent an integer of 0 to 8. Further, In the above chemical formulae (B-6), (B-7), (B-14), (B-16), (B-17), (B-20) to (B-24), (B-26), (B-29) to (B-31), (B-37) and (B-38), n's each independently may represent an integer of 1 to 8. In the above chemical formulae (B-29) to (B-38), R's each independently represents an alkyl group having 1 to 3 carbon atoms.

Further, the position of an amino group (—NH$_2$) which is directly bonded to an aromatic ring by replacement of a hydrogen atom of the aromatic ring (for example, in the case of the chemical formulae (A-1) to (A-20) and (B-6) to (B-38), the aromatic ring is a benzene ring; in the case of the chemical formula (B-1), the aromatic ring is a pyridine ring; in the case of the chemical formula (B-2), the aromatic ring is a pyridazine ring; in the case of the chemical formulae (B-3) and (B-4), the aromatic ring is a pyrazine ring; and in the case of the chemical formula (B-5), the aromatic ring is a 1,3,5-triazine ring) contained in the structure of each of the chemical formulae (A-1) to (A-20) and (B-1) to (B-38) is not particularly limited.

When the ratio of the number of nitrogen atoms derived from the nitrogen atom-containing functional group other than two amino groups in the second diamine to the number of acidic groups derived from the first diamine contained in the polyimide and the precursor of the polyimide constituting the alignment film is from 20:80 to 80:20 (from 0.25 to 4.0), a favorable property of preventing burn-in is obtained. Therefore, the ratio of the number of nitrogen atoms derived from the nitrogen atom-containing functional group to the number of acidic groups derived from the first diamine contained in the polyimide and the precursor of the polyimide constituting the alignment film may be from 0.25 to 4.0.

Here, the number of nitrogen atoms derived from the nitrogen atom-containing functional group will be described. For example, the compound of (B-1) is a compound in which two diamines are bonded to a pyridine ring. The nitrogen atom-containing functional group in the compound of (B-1) is a pyridyl group, and the number of nitrogen atoms of the pyridyl group is 1, and therefore, the number of nitrogen atoms derived from the nitrogen atom-containing functional group is 1. Further, for example, the compound of (B-2) is a compound in which two diamines are bonded to a pyridazine ring. The nitrogen atom-containing functional group in the compound of (B-2) is a pyridazinyl group, and the number of nitrogen atoms of the pyridazinyl group is 2, and therefore, the number of nitrogen atoms derived from the nitrogen atom-containing functional group is 2. Further, the compound of (B-6) is a compound in which one amide group is contained in the chemical structure other than two diamines. The nitrogen atom-containing functional group in the compound of (B-6) is an amide group, and the number of nitrogen atoms of the amide group is 1, and therefore, the number of nitrogen atoms derived from the nitrogen atom-containing functional group is 1. Similarly, the number of nitrogen atoms derived from the nitrogen atom-containing functional group in the compounds (B-3) and (B-4) is 2. Further, the number of nitrogen atoms derived from the nitrogen atom-containing functional group in the compound (B-5) is 3.

The ratio of the number of nitrogen atoms derived from the nitrogen atom-containing functional group to the number of acidic groups derived from the first diamine contained in the polyimide and the precursor of the polyimide constituting the alignment film may be from 3/7 to 7/3 (in other words, (the number of acidic groups derived from the first diamine):(the number of nitrogen atoms derived from the nitrogen atom-containing functional group) may be from 30:70 to 70:30). Further, the ratio of the number of nitrogen atoms derived from the nitrogen atom-containing functional group to the number of acidic groups derived from the first diamine contained in the polyimide and the precursor of the polyimide constituting the alignment film may be from 2/3 to 3/2 (in other words, (the number of acidic groups derived from the first diamine):(the number of nitrogen atoms derived from the nitrogen atom-containing functional group) may be from 40:60 to 60:40).

Further, in the diamine which is a starting material, the ratio of the content of the first diamine to the content of the second diamine may be from 20:80 to 80:20. The ratio is preferably from 30:70 to 70:30, more preferably from 40:60 to 60:40. This provides a favorable property of preventing burn-in.

Further, in the diamine which is a starting material, the sum of the content rate of the first diamine and the second diamine may be 30 mol % or more of the total amount of the diamine components. That is, the sum of the content rate of the first diamine and the content of the second diamine in the diamine to be used for forming the polyimide and the precursor of the polyimide is 30 mol % or more. This provides a favorable property of preventing burn-in. The sum of the content rate of the first diamine and the content rate of the second diamine is preferably 35 mol % or more, and more preferably 40 mol % or more in the diamine which is a starting material.

The polyimide and the precursor of the polyimide constituting the alignment film may contain an aliphatic dianhydride in an amount of 50 mol % or more as a starting material. By incorporating an aliphatic dianhydride in an amount of 50 mol % or more in the acid anhydride which is a starting material, the transparency of the alignment film is improved, and a high transmittance is obtained. Further, the polyimide and the precursor of the polyimide constituting the alignment film preferably contain an aliphatic dianhydride in an amount of 70 mol % or more as a starting material. By incorporating an aliphatic dianhydride in an amount of 70 mol % or more in the acid anhydride which is a starting material, the transparency of the alignment film is further improved, and a higher transmittance is obtained as compared with the case where an aliphatic dianhydride is contained in an amount of 50 mol % or more.

Specific examples of the aliphatic dianhydride include the following compounds, though not limited thereto: cyclobutane-1,2,3,4-tetracarboxylic dianhydride (CBDA), 3c-carboxymethylcyclopentane-1r,2c,4c-tricarboxylic acid 1,4:2,3-dianhydride (TCAAH), cyclohexane-1,2,4,5-tetracarboxylic dianhydride (CHDA), 1,5-cyclooctadiene-1,2,5,6-tetracarboxylic dianhydride (COEDA), 5-carboxymethylbicyclo[2.2.1]heptane-2,3,6-tricarboxylic acid 2,3:5,6-dianhydride (NDA), dicyclohexyl-3,3',4,4'-tetracarboxylic dianhydride (DCHA), 4,4'-decamethylenedioxybis(3,4'-cyclohexanedicarboxylic anhydride) (DOHA), 5,5'-ethylenedioxybis(2,3-norbornanedicarboxylic anhydride) (EOBN), butane-1,2,3,4-tetracarboxylic dianhydride (BuDA), and ethane-1,1,2,2-tetracarboxylic dianhydride (EtDA).

Further, representative examples of an aromatic dianhydride include pyromellitic dianhydride (PMDA).

Hereinafter, embodiments of the invention will be described in detail with reference to the attached drawings. An alignment control film according to the invention used in these embodiments is shown as an example, and it has been confirmed that one having other structure has also the same effect. Incidentally, in the following description, a substrate having an active element such as a thin-film transistor formed thereon is referred to as "active matrix substrate". Further, when a counter substrate is provided with a color filter, the substrate is also referred to as "color filter substrate". Further, in the invention, a preferred contrast as a target is 500:1 or more, and a desired time for eliminating an afterimage as a target is preferably 5 minutes or less. Incidentally, the time for eliminating an afterimage is determined by the method defined in the following embodiments.

First Embodiment

Figure 2A:
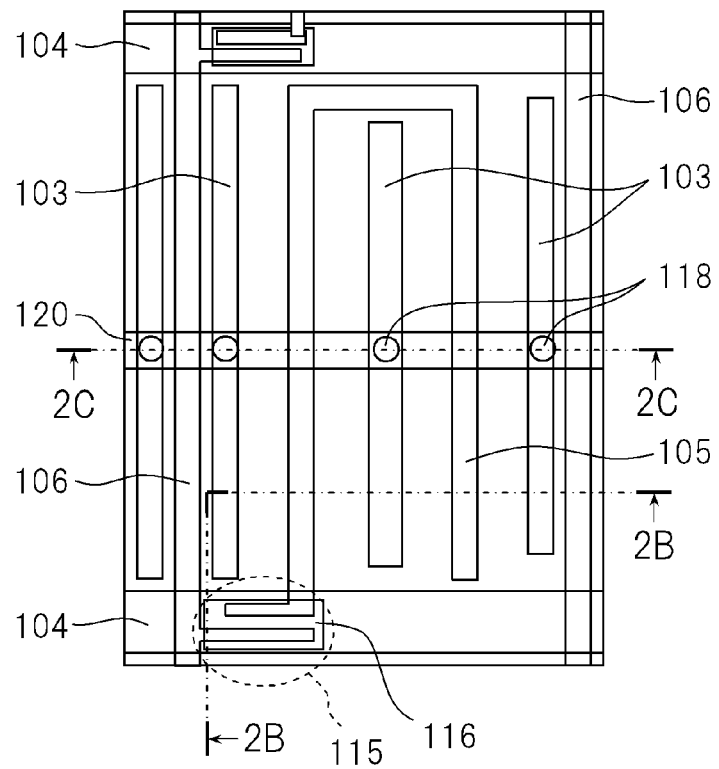
FIG. 2A is a schematic plan view of an active matrix substrate illustrating the structure of one pixel and the vicinity thereof of the liquid crystal display device according to the first embodiment.
Figure 2B:
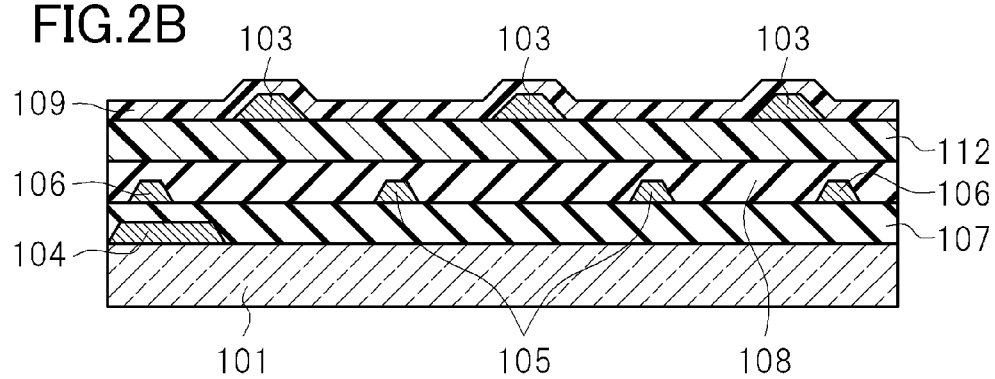
FIG. 2B is a cross-sectional view taken along the line 2B-2B in FIG. 2A.
Figure 2C:
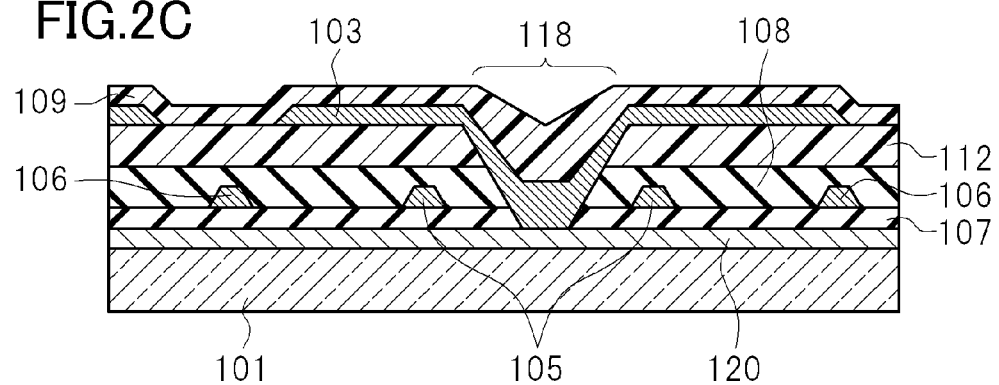
FIG. 2C is a cross-sectional view taken along the line 2C-2C in FIG. 2A.

FIG. 1 is a schematic cross-sectional view of one pixel and the vicinity thereof of a liquid crystal display device according to a first embodiment. Further, FIG. 2A to FIG. 2C are schematic plan views of an active matrix substrate illustrating the structure of one pixel and the vicinity thereof of the liquid crystal display device according to the first embodiment. FIG. 2A is a schematic plan view of an active matrix substrate illustrating the structure of one pixel and the vicinity thereof of the liquid crystal display device according to the first embodiment. FIG. 2B is a cross-sectional view taken along the line 2B-2B in FIG. 2A. FIG. 2C is a cross-sectional view taken along the line 2C-2C in FIG. 2A. Further, FIG. 1 corresponds to a portion of the cross-sectional view taken along the line 2B-2B in FIG. 2A.

Incidentally, FIG. 2B and FIG. 2C are schematic views with emphasis on the structure of a main portion and do not correspond one-to-one to the cross-sections taken along the lines 2B-2B and 2C-2C in FIG. 2A, respectively. For example, in FIG. 2B, a semiconductor film 116 is not shown, and in FIG. 2C, among through-holes 118 for connecting a common electrode 103 to a common line 120, only one is representatively shown.

In this embodiment, a scan line (gate electrode) 104 and a common electrode line (common line) 120, each of which is made of chromium (Cr), are disposed on a glass substrate 101 as the active matrix substrate (first substrate), and a gate insulating film 107 made of silicon nitride is formed so as to cover the gate electrode 104 and the common line 120.

Further, on the gate electrode 104, a semiconductor film 116 made of amorphous silicon or polysilicon is disposed through the gate insulating film 107. This semiconductor film 116 functions as an active layer of a thin-film transistor (TFT) 115 serving as an active element. Further, a signal line (drain electrode) 106 made of Cr—Mo (chromium—molybdenum) and a pixel electrode (source electrode) 105 are disposed so as to partly overlap the pattern of the semiconductor film 116. A protective insulating film 108 made of silicon nitride is formed so as to cover all of these members.

Further, as shown in FIG. 2C, the common electrode 103 connected to the common line 120 is disposed on an overcoat layer (organic protective film) 112 through the through-hole 118 that is formed passing through the gate insulating film 107 and the protective insulating film 108. Further, as shown in FIG. 2A, the common electrodes 103 drawn from the common line 120 through the through-holes 118 are formed so as to face the pixel electrodes 105 in one pixel region in a plane.

In this embodiment, the pixel electrodes 105 are disposed below the protective insulating film 108 which is disposed below the organic protective film 112, and the common electrodes 103 are disposed on the organic protective film 112. A region sandwiched by these plural pixel electrodes 105 and the common electrodes 103 constitutes one pixel. Further, an alignment control film 109 is formed on the surface of the active matrix substrate having the thus constructed unit pixels disposed thereon in a matrix shape, that is, on the organic protective film 112 having the common electrodes 103 formed thereon.

Meanwhile, as shown in FIG. 1, a color filter layer 111 is disposed on the glass substrate 102 constituting the counter substrate so as to be partitioned into sections for the individual pixels by a light shielding film (black matrix) 113. In addition, the color filter layer 111 and the light shielding film 113 are covered with the organic protective film 112 made of a transparent insulating material. Further, the alignment control film 109 is formed also on the organic protective film 112 to constitute the color filter substrate (second substrate).

Incidentally, the active matrix substrate (first substrate) and the color filter substrate (second substrate) constitute a pair of substrates. Accordingly, in this specification, the active matrix substrate (first substrate) and the color filter substrate (second substrate) are sometimes collectively referred to as "a pair of substrates".

To these alignment control films 109, a liquid crystal alignment ability is imparted by a rubbing alignment method or by irradiation with linearly polarized ultraviolet light which is extracted by using a pile polarizer in which quartz plates are laminated on each other using a high-pressure mercury lamp as a light source.

The glass substrate 101 constituting the active matrix substrate and the glass substrate 102 constituting the color filter substrate are disposed such that the surfaces of the alignment control films 109 of the respective substrates face each other, and a liquid crystal layer (liquid crystal composition layer) 110b composed of liquid crystal molecules 110a is disposed between the glass substrates. Further, the glass substrate 101 constituting the active matrix substrate and the glass substrate 102 constituting the color filter substrate have polarizing plates 114 formed on each of the outer surfaces thereof.

As described above, an active matrix type liquid crystal display device (TFT liquid crystal display device) using a thin-film transistor (TFT) is constructed. In this TFT liquid crystal display device, when an electric field is not applied, the liquid crystal molecules 110a constituting the liquid crystal composition layer 110b are aligned substantially in parallel with the surfaces of the glass substrates 101 and 102 disposed to face each other, and are homogeneously aligned in an initial alignment direction determined by the alignment treatment.

When the TFT 115 is turned on by applying a voltage to the gate electrode 104, an electric field 117 is applied to the liquid crystal composition layer 110b due to the electric potential difference between the pixel electrode 105 and the common electrode 103, and the liquid crystal molecules 110a constituting the liquid crystal composition layer 110b turn in the direction of the electric field due to the interaction between the dielectric anisotropy of the liquid crystal composition layer 110b and the electric field. In this case, the light transmittance of the liquid crystal display device is changed by the refractive anisotropy of the liquid crystal composition layer 110b and the action of the polarizing plates 114, whereby display can be carried out.

The organic protective film 112 may be made of a thermosetting resin such as an acrylic resin, an epoxy-acrylic resin, or a polyimide resin having excellent insulating property and transparency. The organic protective film 112 may also be made of a photo-curable transparent resin or an inorganic material such as a polysiloxane resin. Further, the organic protective film 112 may serve also as the alignment control film 109.

In general, it is known that, unlike the vertical electric field mode typified by the conventional TN mode, the IPS mode fundamentally does not require an interface tilt with respect to the surface of a substrate and as the interface tilt angle is smaller, the viewing angle characteristic is higher. In particular, by setting the interface tilt angle to 1 degree or less, changes in color and brightness due to the viewing angle of the liquid crystal display device can be remarkably suppressed, and therefore, alignment by a photo-alignment method with which a tilt angle is caused less is effective.

Subsequently, as a method for producing the liquid crystal display device according to this embodiment, the formation of an alignment control film using a rubbing less alignment method for an alignment control film will be described. A flow of a process of forming the alignment control film according to this embodiment includes the following steps (1) to (4): (1) coating and forming an alignment control film (forming a uniform coating film on the entire surface of the display region); (2) imidizing the alignment control film by baking (removing a varnish solvent and promoting polyimidization to provide high heat resistance); (3) imparting a liquid crystal alignment ability by irradiation with polarized light (imparting a uniform alignment ability to the display region); and (4) promoting and stabilizing the alignment ability (by heating, infrared irradiation, far-infrared irradiation, electron beam irradiation, or radiation irradiation).

The alignment control film is formed through the above four-step process. However, the production method is not limited to the order of the process of the above-described steps (1) to (4), and a further effect is expected in the following cases (a) and (b): (a) the above-described steps (3) and (4) are processed such that the steps temporally overlap each other to accelerate the impartment of a liquid crystal alignment ability and induce a crosslinking reaction or the like, whereby the alignment control film can be more effectively formed; and (b) in the case of adopting heating, infrared irradiation, far-infrared irradiation, or the like in the above-described step (4), the above-described steps (2), (3), and (4) are processed such that the steps temporally overlap each other, whereby the process of the above-described step (4) can also function as the imidization process of the above-described step (2), and therefore the alignment control film can be formed in a short time.

Subsequently, a specific production method according to this embodiment will be described. As the glass substrate 101 constituting the active matrix substrate and the glass substrate 102 constituting the color filter substrate, a surface-polished glass substrate having a thickness of 0.7 mm is used. The thin-film transistor 115 to be formed on the glass substrate 101 is composed of the pixel electrode (source electrode) 105, the signal line (drain electrode) 106, the scan line (gate electrode) 104, and the semiconductor film 116 made of amorphous silicon.

All of the scan line 104, the common electrode line 120, the signal line 106, and the pixel electrode 105 were formed by patterning a chromium film, and the distance between the pixel electrode 105 and the common electrode 103 was set to 7 μm. Incidentally, for the common electrode 103 and the pixel electrode 105, a chromium film which has a low resistance and facilitates patterning was used, however, it is also possible to form transparent electrodes using an ITO film for achieving a higher brightness characteristic.

The gate insulating film 107 and the protective insulating film 108 were made of silicon nitride and the thickness of each of these films was set to 0.3 μm. An acrylic resin was coated thereon and a heat treatment was performed at 220° C. for 1 hour, thereby forming a transparent insulating organic protective film 112.

Subsequently, as shown in FIG. 2C, the through-hole 118 was formed down to the common electrode line 120 by photolithography and an etching treatment, and the common electrode 103 connected to the common electrode line 120 was formed by patterning.

As a result, in a unit pixel (one pixel), as shown in FIG. 2A, the pixel electrode 105 was disposed among the three common electrodes 103, and an active matrix substrate having 1024×3×768 pixels formed by 1024×3 (corresponding to R, G, and B) signal lines 106 and 768 scan lines 104 was obtained.

In this embodiment, as the alignment control film 109, an alignment film material in which a polyamide acid obtained using 4,4'-diaminodiphenyl ether and 1,2,3,4-cyclobutane tetracarboxylic dianhydride as starting materials was mixed with each of a variety of polyamide acids synthesized according to a starting material composition shown in the following Table 1A at a ratio of 1:1 was prepared. By using an alignment control film formed using the thus prepared alignment film material, a liquid crystal display device was produced. A varnish containing 5 wt % of the resin component, 60 wt % of DMAC, 20 wt % of γ-butyrolactone, and 15 wt % of butyl cellosolve was prepared and a film was formed by printing the varnish on the active matrix substrate, followed by a heat treatment to effect imidization, whereby the alignment control film 109, which is dense and composed of a polyimide and a polyamide acid and has an imidization ratio of about 95% or more and a film thickness of about 110 nm, was formed.

TABLE 1A

| Alignment film | First diamine component | (mol %) | Second diamine component | (mol %) | Acid dianhydride component | (mol %) |
|---|---|---|---|---|---|---|
| Alignment film 1 | A-1 | 40 | B-4 | 60 | BuDA | 100 |
| Alignment film 2 | A-6 | 50 | B-5 | 50 | BuDA | 100 |
| Alignment film 3 | A-10 | 40 | B-7 (n = 1) | 60 | BuDA | 100 |
| Alignment film 4 | A-13 | 40 | B-8 | 60 | BuDA | 100 |
| Alignment film 5 | A-15 | 40 | B-9 | 60 | BuDA | 100 |
| Alignment film 6 | A-1 | 20 | B-2 | 60 | BuDA | 40 |
|  | A-3 | 20 |  |  | CBDA | 60 |
| Alignment film 7 | A-8 | 60 | B-6 (n = 3) | 40 | BuDA | 100 |
| Alignment film 8 | A-2 | 50 | B-1 | 30 | BuDA | 100 |
|  |  |  | B-8 | 20 |  |  |
| Alignment film 9 | A-14 | 60 | B-4 | 20 | BuDA | 100 |
|  |  |  | B-7 | 20 |  |  |
| Alignment film 10 | A-11 (n = 2) | 60 | B-10 | 40 | BuDA | 100 |
| Alignment film 11 | A-1 | 30 | B-1 | 20 | BuDA | 70 |
|  | A-4 | 15 | B-12 | 10 | CHDA | 30 |
|  | A-7 | 15 | B-13 | 10 |  |  |
| Alignment film 12 | A-1 | 30 | B-1 | 70 | DCHA | 100 |
| Alignment film 13 | A-1 | 20 | B-1 | 80 | CHDA | 100 |
| Alignment film 14 | A-1 | 10 | B-1 | 90 | CHDA | 100 |
| Alignment film 15 | A-1 | 90 | B-1 | 10 | DCHA | 100 |

In the same manner, a film was also formed by printing a similar polyamide acid amide varnish on the surface of the other glass substrate 102 having an ITO film formed thereon, whereby the alignment control film 109, which is dense and composed of a polyimide and a polyamide acid and has an imidization ratio of about 95% or more and a film thickness of about 110 nm, was formed. In order to impart a liquid crystal alignment ability to the surface thereof, the alignment control film 109 was irradiated with polarized ultraviolet light. As a light source, a high-pressure mercury lamp was used, and the ultraviolet light with a wavelength of from 240 nm to 320 nm was extracted through an interference filter and changed by a pile polarizer in which quartz substrates are laminated on each other into linearly polarized light with a polarization ratio of about 10:1, and irradiation was performed at an irradiation energy of 1.5 J/cm². As a result, the alignment direction of the liquid crystal molecules on the surface of the alignment control film was found to be orthogonal to the polarization direction of the irradiated polarized ultraviolet light.

Subsequently, the two glass substrates 101 and 102 were disposed such that the surfaces of the respective substrates having the alignment control film 109 with the liquid crystal alignment ability faced each other and a spacer composed of dispersed spherical polymer beads was interposed therebetween. A sealing agent was applied to peripheral portions, and the liquid crystal display panel (hereinafter, also referred to as "cell") serving as the liquid crystal display device was assembled. The liquid crystal alignment directions on the two glass substrates 101 and 102 were substantially in parallel with each other. The cell was injected under vacuum with a nematic liquid crystal composition A having a dielectric anisotropy $\Delta\epsilon$ of a positive value of 10.2 (1 kHz, 20° C.), a refractive index anisotropy $\Delta n$ of 0.075 (a wavelength of 590 nm, 20° C.), a twist elastic constant K2 of 7.0 pN, and a nematic-isotropic phase transition temperature T (N—I) of about 76° C., and sealing was performed with a sealing material made of an ultraviolet curing resin. The liquid crystal layer of the produced liquid crystal panel had a thickness (gap) of 4.2 μm.

The liquid crystal display panel has a retardation ($\Delta n \cdot d$) of about 0.31 μm. The retardation ($\Delta n \cdot d$) preferably satisfies the following formula: 0.2 μm$\leq$($\Delta n \cdot d$)$\leq$0.5 μm, and if the retardation exceeds this range, a problem arises that white display is colored, and so on. Further, a homogeneously aligned liquid crystal display panel was produced using an alignment control film and a liquid crystal composition equivalent to those used in this panel, and the pretilt angle of the liquid crystal was measured by a crystal rotation method and found to be about 0.2 degrees. This liquid crystal display panel was sandwiched between the two polarizing plates 114 such that the polarized light transmission axis of one of the polarizing plates was substantially in parallel with the above-described liquid crystal alignment direction, and the polarized light transmission axis of the other polarizing plate was orthogonal thereto. Then, a drive circuit, a backlight, and the like were connected thereto to form a module, whereby an active matrix type liquid crystal display device was obtained. In this embodiment, a normally closed characteristic in which dark display is produced at a low voltage and bright display is produced at a high voltage was adopted.

Then, the display quality of the liquid crystal display device according to this embodiment was evaluated, and the high-quality display with a contrast ratio of 500:1 was confirmed and also a wide viewing angle in halftone display was confirmed.

Then, evaluation was performed using an oscilloscope in combination with a photodiode in order to quantitatively measure image burn-in or afterimage in the liquid crystal display device according to this embodiment. First, a window pattern was displayed on the screen at the maximum brightness for 50 hours, and then, the whole screen was switched to halftone display in which afterimage was most visible, in this case, the brightness was set to 10% of the maximum brightness, and the time until the pattern of an edge portion of the window pattern disappeared was evaluated as an afterimage disappearance time. It should be noted that an acceptable afterimage disappearance time is 5 minutes or less. Further, a transmittance Y (%) was evaluated for each alignment film. The transmittance (Y) is a transmittance (%) calculated from the spectrum transmitted through the alignment film in accordance with JIS Z 8722. The results are shown in the following table 1B.

TABLE 1B

| Alignment film | Afterimage disappearance time (min) | Transmittance Y (%) |
|---|---|---|
| Alignment film 1 | 3.0 | >99.0 |
| Alignment film 2 | 1.5 | >99.0 |
| Alignment film 3 | 0.9 | >99.0 |
| Alignment film 4 | 1.6 | >99.0 |
| Alignment film 5 | 2.9 | >99.0 |
| Alignment film 6 | 2.8 | >99.0 |
| Alignment film 7 | 1.7 | >99.0 |
| Alignment film 8 | 1.1 | >99.0 |
| Alignment film 9 | 1.7 | >99.0 |
| Alignment film 10 | 1.5 | >99.0 |
| Alignment film 11 | 0.5 | >99.0 |
| Alignment film 12 | 3.8 | >99.0 |
| Alignment film 13 | 4.9 | >99.0 |
| Alignment film 14 | 15.0 | >99.0 |
| Alignment film 15 | 11.0 | >99.0 |

Second Embodiment

Figure 3:
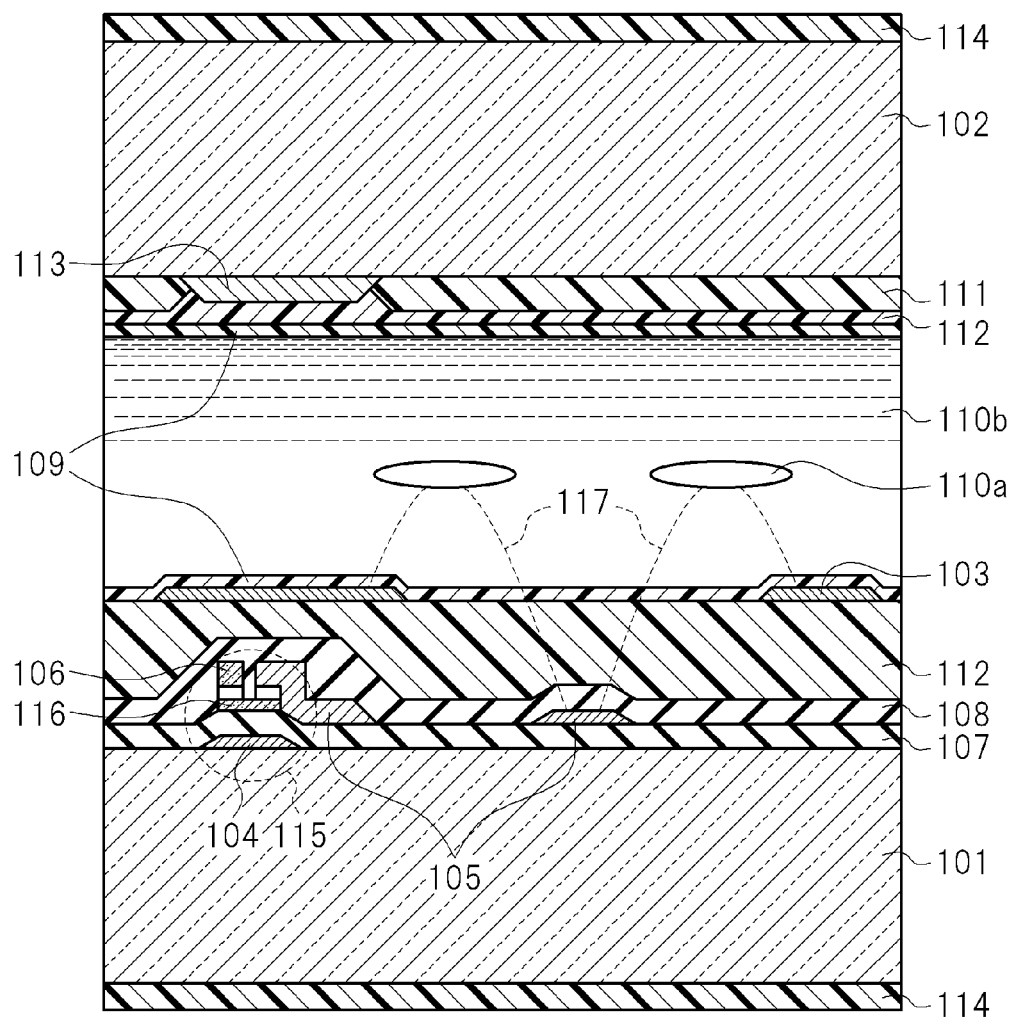
FIG. 3 is a schematic cross-sectional view of one pixel and the vicinity thereof of a liquid crystal display device according to a second embodiment.
Figure 4A:
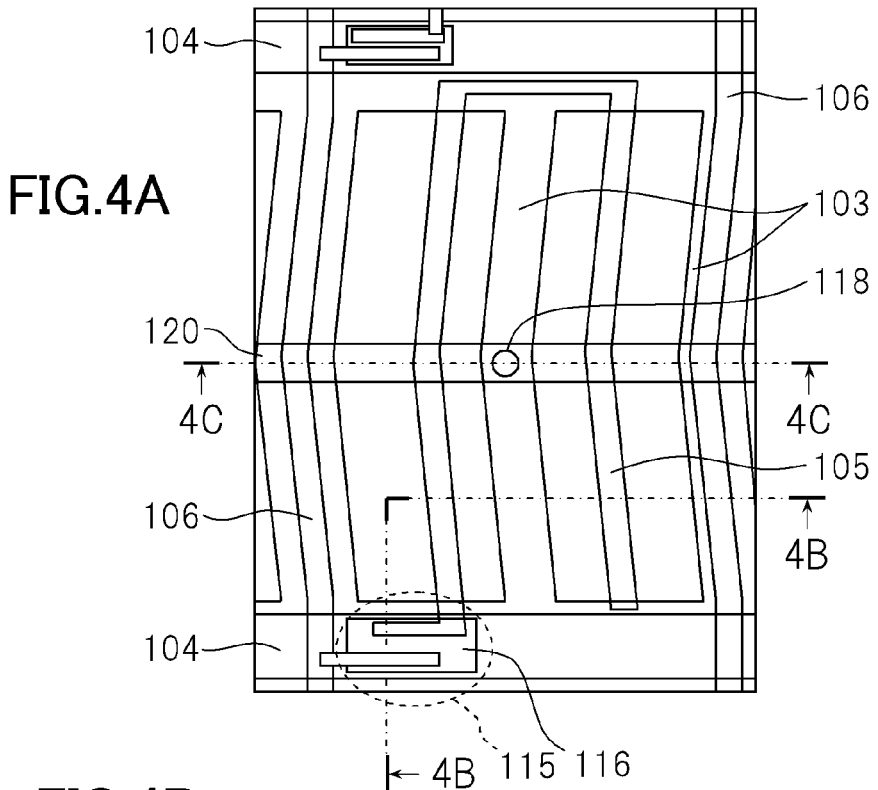
FIG. 4A is a schematic plan view of an active matrix substrate illustrating the structure of one pixel and the vicinity thereof of the liquid crystal display device according to the second embodiment.
Figure 4B:
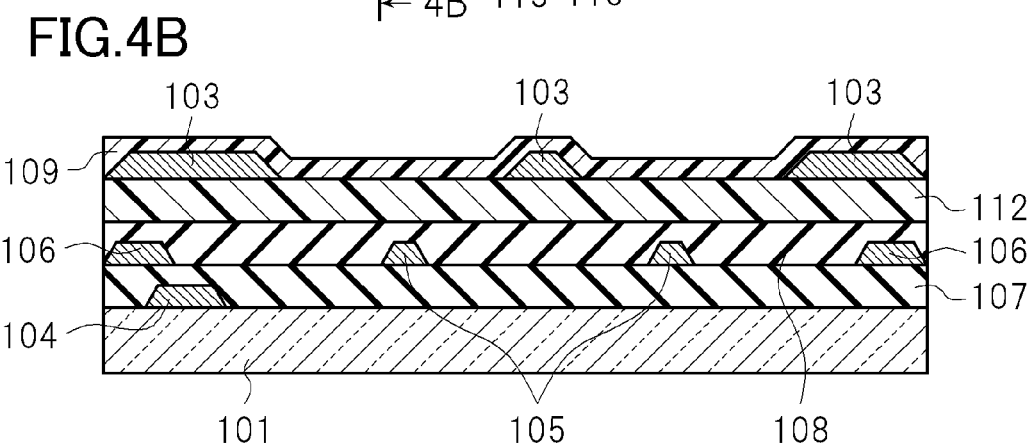
FIG. 4B is a cross-sectional view taken along the line 4B-4B in FIG. 4A.
Figure 4C:
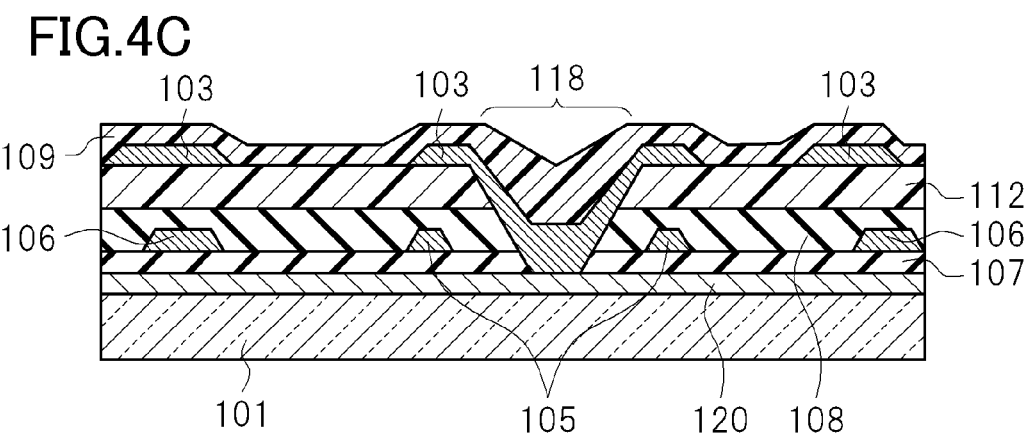
FIG. 4C is a cross-sectional view taken along the line 4C-4C in FIG. 4A.

FIG. 3 is a schematic cross-sectional view of one pixel and the vicinity thereof of a liquid crystal display device according to a second embodiment. FIG. 4A is a schematic plan view of an active matrix substrate illustrating the structure of one pixel and the vicinity thereof of the liquid crystal display device according to the second embodiment. FIG. 4B is a cross-sectional view taken along the line 4B-4B in FIG. 4A. FIG. 4C is a cross-sectional view taken along the line 4C-4C in FIG. 4A.

Further, FIG. 4A to FIG. 4C are schematic plan views of an active matrix substrate illustrating the structure of one pixel and the vicinity thereof of the liquid crystal display device according to this embodiment, and FIG. 4A shows a plan view, FIG. 4B shows a cross-sectional view taken along the line 4B-4B in FIG. 4A, and FIG. 4C shows a cross-sectional view taken along the line 4C-4C in FIG. 4A. Further, FIG. 3 corresponds to a portion of the cross-sectional view taken along the line 4B-4B in FIG. 4A.

Incidentally, FIG. 4B and FIG. 4C are schematic views with emphasis on the structure of a main portion and do not correspond one-to-one to the cross-sections taken along the lines 4B-4B and 4C-4C in FIG. 4A, respectively. For example, in FIG. 4B, a semiconductor film 116 is not shown.

In this embodiment, a gate electrode 104 and a common electrode line 120, which are made of Cr, are disposed on a glass substrate 101 constituting the active matrix substrate, and a gate insulating film 107 made of silicon nitride is formed so as to cover the gate electrode 104 and the common electrode line 120. Further, on the gate electrode 104, a semiconductor film 116 made of amorphous silicon or polysilicon is disposed through the gate insulating film 107 and serves as an active layer of a thin-film transistor 115 serving as an active element.

Further, a drain electrode 106 made of chromium-molybdenum and a pixel electrode (source electrode) 105 are disposed so as to partly overlap the pattern of the semiconductor film 116, and a protective insulating film 108 made of silicon nitride is formed so as to cover all of these members. On the protective insulating film 108, an organic protective film 112 is disposed. This organic protective film 112 is made of, for example, a transparent material such as an acrylic resin. Further, the pixel electrode 105 is formed of a transparent electrode made of ITO ($In_2O_3$:Sn) or the like. The common electrode 103 is connected to the common electrode line 120 through a through-hole 118 that passes through the gate insulating film 107, the protective insulating film 108, and the organic protective film 112.

In the case of applying an electric field for driving the liquid crystal, the common electrode 103 paired with the pixel electrode 105 is formed so as to surround the region of one pixel in a plane. Further, the common electrode 103 is disposed on the organic protective film 112. The common electrode 103 is disposed so as to cover the drain electrode 106, the scan line 104, and the thin-film transistor 115 serving as an active element, each of which is disposed below when being viewed from the top. The common electrode 103 also functions as a light shielding layer that shields light from the semiconductor film 116.

Further, an alignment control film 109 is formed on the surface of the glass substrate 101 constituting the active matrix substrate having the thus constructed unit pixel (one pixel) disposed thereon in a matrix shape, that is, on the organic protective film 112 and on the common electrodes 103 formed thereon. Meanwhile, also on the glass substrate 102 constituting the counter substrate, an alignment control film 109 is formed on the organic protective film 112 formed on the color filter layer 111.

Here, in the same manner as in the first embodiment, to these alignment control films 109, a liquid crystal alignment ability is imparted by irradiation with linearly polarized ultraviolet light extracted using a pile polarizer in which quartz plates are laminated on each other using a high-pressure mercury lamp as a light source.

Then, the glass substrate 101 and the counter glass substrate 102 are disposed such that the surfaces of the respective substrates having the alignment control film 109 formed thereon face each other, and a liquid crystal composition layer 110b composed of liquid crystal molecules 110a is disposed between the glass substrates. Further, the glass substrate 101 and the counter glass substrate 102 have polarizing plates 114 formed on each of the outer surfaces thereof.

As described above, also in this embodiment, in the same manner as the above-described first embodiment, the pixel electrode 105 is disposed below the organic protective film 112 and the protective insulating film 108, and the common electrode 103 is disposed above the pixel electrode 105 and the organic protective film 112. Further, in the case where the electric resistance of the common electrode 103 is sufficiently low, the common electrode 103 can also function as the common electrode line 120 formed in the lowest layer. In this case, the formation of the common electrode line 120 disposed in the lowest layer and the processing of the through-hole 118 accompanied by the formation of the common electrode line 120 can be omitted.

In this embodiment, as shown in FIG. 4A, one pixel is constituted by a region surrounded by the common electrodes 103 formed in a lattice and is disposed such that the one pixel is divided into four regions together with the pixel electrode 105. Further, the pixel electrode 105 and the common electrodes 103 that face the pixel electrode 105 are of a zigzag bent structure in which these components are arranged in parallel with each other. One pixel forms a plurality of sub-pixels of two or more. With this structure, a change in color tone within the plane is offset.

Subsequently, a method for producing the liquid crystal display device according to this embodiment will be described. As the glass substrates 101 and 102, a surface-polished glass substrate having a thickness of 0.7 mm is used. The thin-film transistor 115 is composed of the pixel electrode (source electrode) 105, the signal line (drain electrode) 106, the scan line (gate electrode) 104, and the semiconductor film 116 made of amorphous silicon. The scan line 104 was formed by patterning an aluminum film, the common electrode line 120 and the signal line 106 were formed by patterning a chromium film, and the pixel electrode 105 was formed by patterning an ITO film. As shown in FIG. 4A, the components other than the scan line 104 were formed into electrode line patterns which were bent in zigzag. At this time, an angle of bending was set to 10 degrees. The gate insulating film 107 and the protective insulating film 108 were made of silicon nitride, and the film thicknesses thereof were set to 0.3 µm, respectively.

Then, as shown in FIG. 4C, the through-hole 118 having a diameter of about 10 µm was formed into a cylindrical shape down to the common electrode line 120 through a photolithography method and an etching treatment. An acrylic resin was coated on the through-hole 118, and a heat treatment was performed at 220° C. for 1 hour to form a transparent insulating organic protective film 112 which has a dielectric constant of about 4 and a thickness of about 1 µm. The roughness caused by a level difference due to the pixel electrode 105 in the display region was flattened by the organic protective film 112. Further, the roughness caused by a level difference at a boundary portion of the color filter layer 111 between the adjacent pixels was flattened by the organic protective film 112.

Thereafter, the through-hole 118 was etched again so as to have a diameter of about 7 µm, and the common electrode 103 connected to the common electrode line 120 was formed on the through-hole 118 by patterning an ITO film. At this time, the distance between the pixel electrode 105 and the common electrode 103 was set to 7 µm. Further, the common electrodes 103 were formed in a lattice so as to cover the upper portions of the signal lines 106, the scan lines 104, and the thin-film transistor 115, and to surround the pixel, and were made to also function as a light shielding layer.

As a result, in a unit pixel, as shown in FIG. 4A, the pixel electrode 105 was disposed among the three common electrodes 103, and an active matrix substrate having 1024×3× 768 pixels formed by 1024×3 (corresponding to R, G, and B) signal lines 106 and 768 scan lines 104 was obtained.

In this embodiment, each alignment film material in which a polyamide acid methyl ester obtained using 2,7-diaminofluorene and 1-methyl-1,2,3,4-cyclobutane tetracarboxylic dianhydride as starting materials was mixed with each of a variety of polyamide acid methyl esters synthesized according to a starting material composition shown in the following Table 2A at a ratio of 4:6 was prepared to form the alignment control film 109. By using the alignment control film 109, a liquid crystal display device was produced. A varnish containing 5 wt % of the resin component, 60 wt % of DMAC, 20 wt % of γ-butyrolactone, and 15 wt % of butyl cellosolve was prepared and a film was formed by printing the varnish on the active matrix substrate, followed by a heat treatment to effect imidization, whereby the alignment control film 109, which is dense and composed of a polyimide and a polyamide acid methyl ester and has an imidization ratio of about 95% or more and a film thickness of about 120 nm, was formed.

TABLE 2A

| Alignment film | First diamine component | (mol %) | Second diamine compound | (mol %) | Acid dianhydride component | (mol %) |
|---|---|---|---|---|---|---|
| Alignment film 1 | A-1 | 40 | B-2 | 60 | BuDA | 100 |
| Alignment film 2 | A-7 | 40 | B-8 | 60 | BuDA | 100 |
| Alignment film 3 | A-11 (n = 1) | 40 | B-9 | 60 | BuDA | 100 |
| Alignment film 4 | A-9 (n = 8) | 60 | B-12 | 40 | BuDA | 70 |
|  |  |  |  |  | PMDA | 30 |
| Alignment film 5 | A-9 (n = 8) | 60 | B-5 | 40 | CHDA | 100 |
| Alignment film 6 | — | 0 | B-11 | 100 | DCHA | 100 |
| Alignment film 7 | A-16 | 10 | B-11 | 90 | DCHA | 100 |
| Alignment film 8 | A-16 | 20 | B-11 | 80 | DCHA | 100 |
| Alignment film 9 | A-16 | 30 | B-11 | 70 | DCHA | 100 |
| Alignment film 10 | A-16 | 40 | B-11 | 60 | DCHA | 100 |
| Alignment film 11 | A-16 | 50 | B-11 | 50 | DCHA | 100 |
| Alignment film 12 | A-16 | 100 | — | 0 | DCHA | 100 |

An alignment treatment method was performed by irradiating the film with the same polarized ultraviolet light as that in the first embodiment at an irradiation energy of 1.5 J/cm².

Subsequently, the two glass substrates 101 and 102 were disposed such that the surfaces of the respective substrates having the alignment control film faced each other and a spacer composed of dispersed spherical polymer beads was interposed therebetween. A sealing agent was applied to peripheral portions, and the liquid crystal display panel was assembled. The liquid crystal alignment directions on the two glass substrates 101 and 102 were substantially in parallel with each other.

The liquid crystal display panel was injected under vacuum with a nematic liquid crystal composition A having a dielectric anisotropy $\Delta\epsilon$ of a positive value of 10.2 (1 kHz, 20° C.), a refractive index anisotropy $\Delta n$ of 0.075 (a wavelength of 590 nm, 20° C.), a twist elastic constant K2 of 7.0 pN, and a nematic-isotropic phase transition temperature T (N—I) of about 76° C., and sealing was performed with a sealing material made of an ultraviolet curing resin. The liquid crystal layer of the produced liquid crystal panel had a thickness (gap) of 4.2 µm. This panel had a retardation ($\Delta n \cdot d$) of about 0.31 µm.

Further, a homogeneously aligned liquid crystal display panel was produced using an alignment control film and a liquid crystal composition equivalent to those used in this liquid crystal display panel, and the pretilt angle of the liquid crystal was measured by a crystal rotation method and found to be about 0.2 degrees. This panel was sandwiched between the two polarizing plates 114 such that the polarized light transmission axis of one of the polarizing plates was substantially in parallel with the above-described liquid crystal alignment direction, and the polarized light transmission axis of the other polarizing plate was orthogonal thereto. Then, a drive circuit, a backlight, and the like were connected thereto to form a module, whereby an active matrix type liquid crystal display device was obtained. In this embodiment, a normally closed characteristic in which dark display is produced at a low voltage and bright display is produced at a high voltage was adopted.

Then, the liquid crystal display devices and the alignment films were evaluated in the same manner as in the first embodiment. The results are shown in Table 2B.

TABLE 2B

| Alignment film | Afterimage disappearance time (min) | Transmittance Y (%) |
|---|---|---|
| Alignment film 1 | 3.9 | >99.0 |
| Alignment film 2 | 2.1 | >99.0 |
| Alignment film 3 | 1.8 | >99.0 |
| Alignment film 4 | 3.5 | 98.5 |
| Alignment film 5 | 3.8 | >99.0 |
| Alignment film 6 | 55.0 | >99.0 |
| Alignment film 7 | 26.0 | >99.0 |
| Alignment film 8 | 4.8 | >99.0 |
| Alignment film 9 | 3.5 | >99.0 |
| Alignment film 10 | 2.7 | >99.0 |
| Alignment film 11 | 1.4 | >99.0 |
| Alignment film 12 | 39.0 | >99.0 |

Third Embodiment

Figure 5:
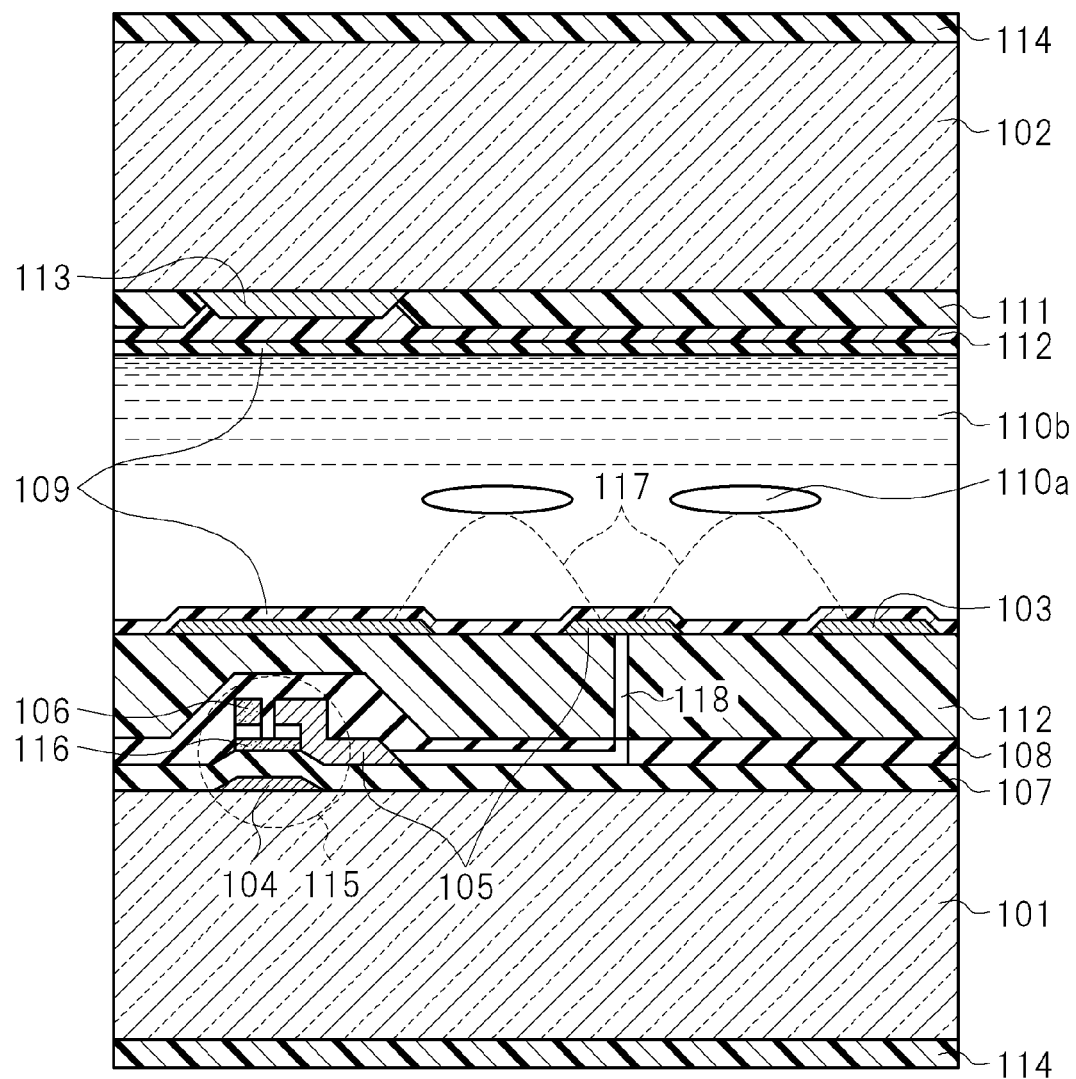
FIG. 5 is a schematic cross-sectional view of one pixel and the vicinity thereof of a liquid crystal display device according to a third embodiment.

FIG. 5 is a schematic cross-sectional view of one pixel and the vicinity thereof of a liquid crystal display device according to a third embodiment. In the drawing, the same symbols as those in the drawings illustrating the above-described respective embodiments correspond to the same functional portions. As shown in FIG. 5, in this embodiment, the pixel electrode 105 disposed below the protective insulating film 108 is pulled up to the upper surface of the organic protective film 112 through the through-hole 118 so as to be arranged in the same layer as that of the common electrode 103. According to this configuration, a voltage for driving the liquid crystal can be further decreased.

In the TFT liquid crystal display device configured as described above, when an electric field is not applied, the liquid crystal molecules 110a constituting the liquid crystal composition layer 110b are substantially in parallel with the surfaces of the glass substrates 101 and 102 disposed to face each other, and are homogeneously aligned in an initial alignment direction determined by the photo-alignment treatment. When the thin-film transistor 115 is turned on by applying a voltage to the gate electrode 104, an electric field 117 is applied to the liquid crystal composition layer 110b due to the electric potential difference between the pixel electrode 105 and the common electrode 103, and the liquid crystal molecules 110a turn in the direction of the electric field due to the interaction between the dielectric anisotropy of the liquid crystal composition and the electric field. In this case, the light transmittance of the liquid crystal display device is changed by the refractive anisotropy of the liquid crystal composition layer 110b and the action of the polarizing plates 114, whereby display can be carried out.

Hereinafter, a method for producing the liquid crystal display device according to this embodiment will be described. As the glass substrates 101 and 102, a surface-polished glass substrate having a thickness of 0.7 mm is used. The thin-film transistor 115 is composed of the pixel electrode (source electrode) 105, the signal line (drain electrode) 106, the scan line (gate electrode) 104, and the semiconductor film 116 made of amorphous silicon. The scan line 104 was formed by patterning an aluminum film, the common electrode line 120, the signal line 106, and the pixel electrode 105 were formed by patterning a chromium film. The gate insulating film 107 and the protective insulating film 108 were made of silicon nitride, and the film thicknesses thereof were set to 0.3 μm, respectively. An acrylic resin was coated thereon, and a heat treatment was performed at 220° C. for 1 hour to form a transparent insulating organic protective film 112 which has a dielectric constant of about 4 and a thickness of about 1.0 μm. The roughness caused by a level difference due to the pixel electrode 105 in the display region was flattened by the organic protective film 112. Further, the roughness caused by a level difference between the adjacent pixels was flattened by the organic protective film 112.

Subsequently, as shown in FIG. 5, the through-hole 118 having a diameter of about 10 μm was formed into a cylindrical shape down to the source electrode 105 through a photolithography method and an etching treatment, and the pixel electrode 105 connected to the source electrode 105 was formed by patterning an ITO film. Further, also in the common electrode line 120, the through-hole 118 having a diameter of about 10 μm was formed into a cylindrical shape, and the common electrode 103 was formed thereon by patterning an ITO film. At this time, the distance between the pixel electrode 105 and the common electrode 103 was set to 7 μm, and the components other than the scan line 104 were formed into electrode line patterns which were bent in zigzag. At this time, an angle of bending was set to 10 degrees. Further, the common electrodes 103 were formed in a lattice so as to cover the upper portions of the signal lines 106, the scan lines 104, and the thin-film transistor 115, and to surround the pixel, and were made to also function as a light shielding layer.

As a result, the pixel electrode 105 was disposed among the three common electrodes 103 in substantially the same manner as in the second embodiment except that the two through-holes 118 are formed in a unit pixel, and an active matrix substrate having 1024×3×768 pixels formed by 1024×3 (corresponding to R, G, and B) signal lines 106 and 768 scan lines 104 was obtained.

As described above, a liquid crystal display device was produced as shown in FIG. 5 in the same manner as in the second embodiment except for the pixel structure and the alignment control film to be used.

In this embodiment, each alignment film material composed of each of a variety of polyamide acids synthesized according to a starting material composition shown in the following Table 3A was used to form the alignment control film 109, and a liquid crystal display device was produced. A varnish containing 5 wt % of the resin component, 60 wt % of DMAC, 20 wt % of γ-butyrolactone, and 15 wt % of butyl cellosolve was prepared and a film was formed by printing the varnish on the active matrix substrate, followed by a heat treatment to effect imidization, whereby the alignment control film 109, which is dense and composed of a polyimide and a polyamide acid and has an imidization ratio of about 95% or more and a film thickness of about 110 nm, was formed.

TABLE 3A

| Alignment film | First diamine component | (mol %) | Second diamine compound | (mol %) | Acid dianhydride component | (mol %) |
|---|---|---|---|---|---|---|
| Alignment film 1 | A-2 | 40 | B-1 | 60 | BuDA | 100 |
| Alignment film 2 | A-5 | 40 | B-2 | 60 | BuDA | 100 |
| Alignment film 3 | A-12 | 50 | B-7 (n = 5) | 50 | BuDA | 100 |
| Alignment film 4 | A-4 | 30 | B-6 (n = 5) | 70 | BuDA | 70 |
|  |  |  |  |  | PMDA | 30 |
| Alignment film 5 | A-1 | 80 | B-7 (n = 3) | 20 | BuDA | 70 |
|  |  |  |  |  | PMDA | 30 |
| Alignment film 6 | A-6 | 40 | B-9 | 60 | CBDA | 70 |
|  |  |  |  |  | PMDA | 30 |
| Alignment film 7 | A-6 | 5 | B-9 | 95 | CBDA | 70 |
|  |  |  |  |  | PMDA | 30 |
| Alignment film 8 | A-14 | 80 | B-19 | 20 | CBDA | 100 |

As the alignment treatment method, a rubbing alignment treatment was adopted.

The liquid crystal display devices and the alignment films were evaluated in the same manner as in the first embodiment. The results are shown in Table 3B.

TABLE 3B

| Alignment film | Afterimage disappearance time (min) | Transmittance Y (%) |
|---|---|---|
| Alignment film 1 | 1.5 | >99.0 |
| Alignment film 2 | 4.1 | >99.0 |
| Alignment film 3 | 4.0 | >99.0 |
| Alignment film 4 | 2.0 | 98.5 |
| Alignment film 5 | 4.7 | 98.5 |
| Alignment film 6 | 2.7 | 98.5 |
| Alignment film 7 | 10.5 | 98.5 |
| Alignment film 8 | 4.2 | >99.0 |

Fourth Embodiment

Figure 6:
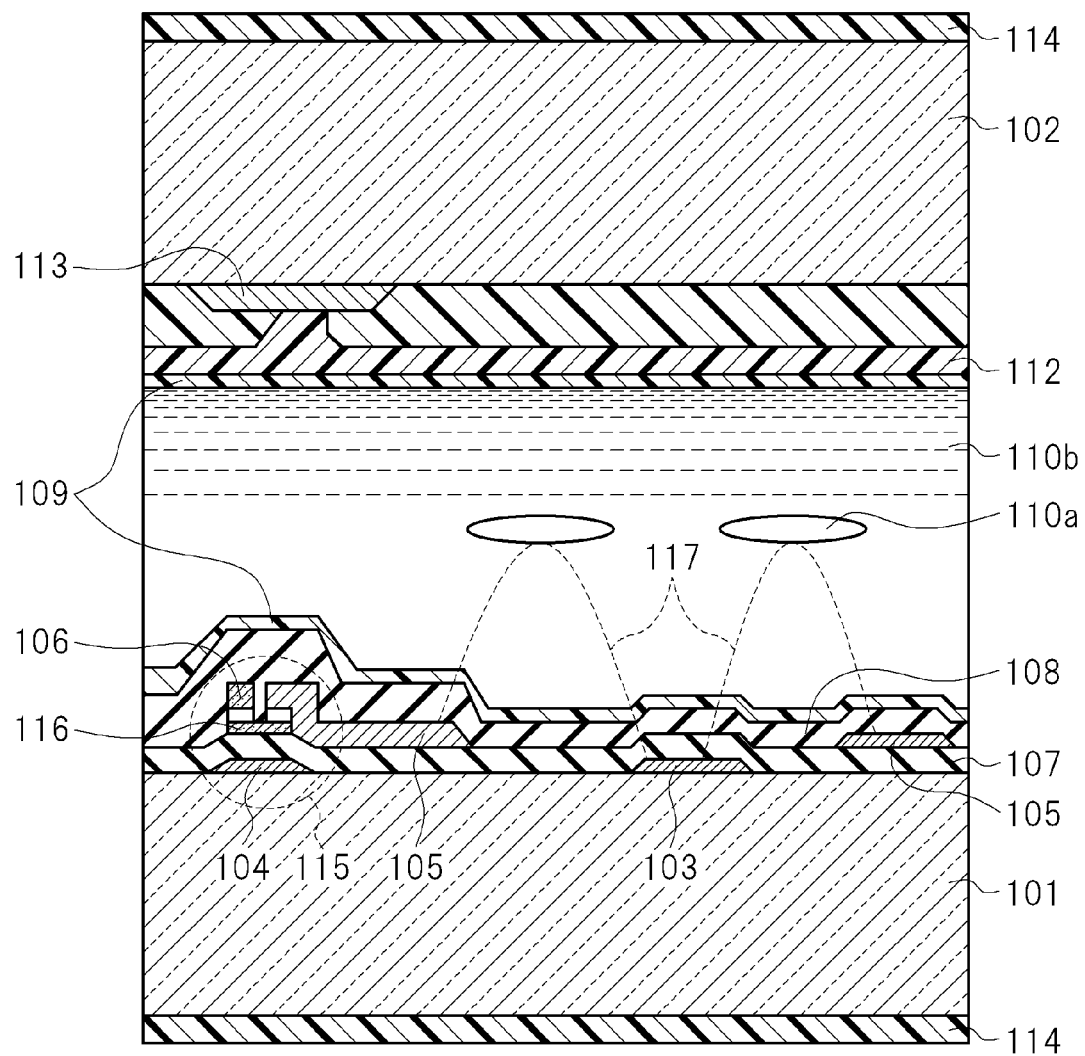
FIG. 6 is a schematic cross-sectional view of one pixel and the vicinity thereof of a liquid crystal display device according to a fourth embodiment.

FIG. 6 is a schematic cross-sectional view of one pixel and the vicinity thereof of a liquid crystal display device according to a fourth embodiment. In the drawing, the same symbols as those in the drawings illustrating the above-described respective embodiments correspond to the same functional portions. In this embodiment, a configuration in which a level difference due to electrodes and the like is large is adopted. In FIG. 6, the gate electrode 104 and the common electrode 103 of the thin-film transistor 115 are formed in the same layer, and the liquid crystal molecules 110a turn in the direction of the electric field due to the electric field 117 caused by the common electrode 103 and the pixel electrode 105.

Further, in the above-described respective embodiments, a plurality of display regions, each of which is composed of the common electrode 103 and the pixel electrode 105, can be provided in one pixel. By providing a plurality of display regions in this manner, even if one pixel is large, a distance between the pixel electrode 105 and the common electrode 103 can be shortened. Therefore, a voltage to be applied for driving the liquid crystal can be decreased.

Further, in the above-described respective embodiments, a material of the transparent conductive film constituting at least one of the pixel electrode and the common electrode is not particularly limited. However, in consideration of the ease of processing, high reliability, and the like, it is preferred to use ion-doped titanium oxide or ion-doped zinc oxide like indium tin oxide (ITO) as the material of the transparent conductive film.

In a method for producing the liquid crystal display device according to this embodiment, as the glass substrates 101 and 102, a surface-polished glass substrate having a thickness of 0.7 mm is used. The thin-film transistor 115 is composed of the pixel electrode (source electrode) 105, the signal line (drain electrode) 106, the scan line (gate electrode) 104, and the semiconductor film 116 made of amorphous silicon. All of the scan line 104, the common electrode line 120, the signal line 106, the pixel electrode 105, and the common electrode 103 were formed by patterning a chromium film, and the distance between the pixel electrode 105 and the common electrode 103 was set to 7 μm. The gate insulating film 107 and the protective insulating film 108 were made of silicon nitride, and the film thicknesses thereof were set to 0.3 μm, respectively.

In this embodiment, each alignment film material in which a polyamide acid t-butyl ester obtained using 1,4-phenylenediamine and 1,2,3,4-cyclobutane tetracarboxylic dianhydride as starting materials was mixed with each of a variety of polyamide acids synthesized according to a starting material composition shown in the following Table 4A at a ratio of 6:4 was prepared to form the alignment control film 109. By using the alignment control film 109, a liquid crystal display device was produced. A varnish containing 5 wt % of the resin component, 60 wt % of DMAC, 20 wt % of γ-butyrolactone, and 15 wt % of butyl cellosolve was prepared and a film was formed by printing the varnish on the active matrix substrate, followed by a heat treatment to effect imidization, whereby the alignment control film 109, which is dense and composed of a polyimide and a polyamide acid and has an imidization ratio of about 95% or more and a film thickness of about 100 nm, was formed.

TABLE 4A

| Alignment film | First diamine component | (mol %) | Second diamine compound | (mol %) | Acid dianhydride component | (mol %) |
|---|---|---|---|---|---|---|
| Alignment film 1 | A-3 | 40 | B-4 | 60 | BuDA | 100 |
| Alignment film 2 | A-5 | 40 | B-4 | 60 | BuDA | 100 |

TABLE 4A-continued

| Alignment film | First diamine component | (mol %) | Second diamine compound | (mol %) | Acid dianhydride component | (mol %) |
|---|---|---|---|---|---|---|
| Alignment film 3 | A-12 | 40 | B-8 | 60 | BuDA | 100 |
| Alignment film 4 | A-14 | 40 | B-8 | 60 | BuDA | 100 |
| Alignment film 5 | A-15 | 40 | B-9 | 60 | BuDA | 100 |
| Alignment film 6 | A-17 | 50 | B-15 | 50 | CHDA | 100 |
| Alignment film 7 | A-1 | 50 | B-16 (n = 3) | 50 | CHDA | 100 |
| Alignment film 8 | A-1 | 50 | B-17 (n = 3) | 50 | CHDA | 100 |
| Alignment film 9 | A-5 | 70 | B-17 (n = 3) | 30 | CHDA | 100 |
| Alignment film 10 | A-16 | 60 | B-20 (n = 1) | 40 | CHDA | 100 |

An alignment treatment method was performed by irradiating the film with the same polarized ultraviolet light as that in the first embodiment at an irradiation energy of 1.5 J/cm$^2$. As a result, an active matrix substrate having 1024×3×768 pixels formed by 1024×3 (corresponding to R, G, and B) signal lines 106 and 768 scan lines 104 was obtained.

As described above, a liquid crystal display device according to this embodiment as shown in FIG. 6 was produced in the same manner as in the first embodiment except for the pixel structure.

The liquid crystal display devices and the alignment films were evaluated in the same manner as in the first embodiment. The results are shown in Table 4B.

TABLE 4B

| Alignment film | Afterimage disappearance time (min) | Transmittance Y (%) |
|---|---|---|
| Alignment film 1 | 2.2 | >99.0 |
| Alignment film 2 | 4.1 | >99.0 |
| Alignment film 3 | 4.2 | >99.0 |
| Alignment film 4 | 2.5 | >99.0 |
| Alignment film 5 | 3.8 | >99.0 |
| Alignment film 6 | 3.2 | >99.0 |
| Alignment film 7 | 3.8 | >99.0 |
| Alignment film 8 | 3.6 | >99.0 |
| Alignment film 9 | 3.7 | >99.0 |
| Alignment film 10 | 2.9 | >99.0 |

Fifth Embodiment

Figure 7:
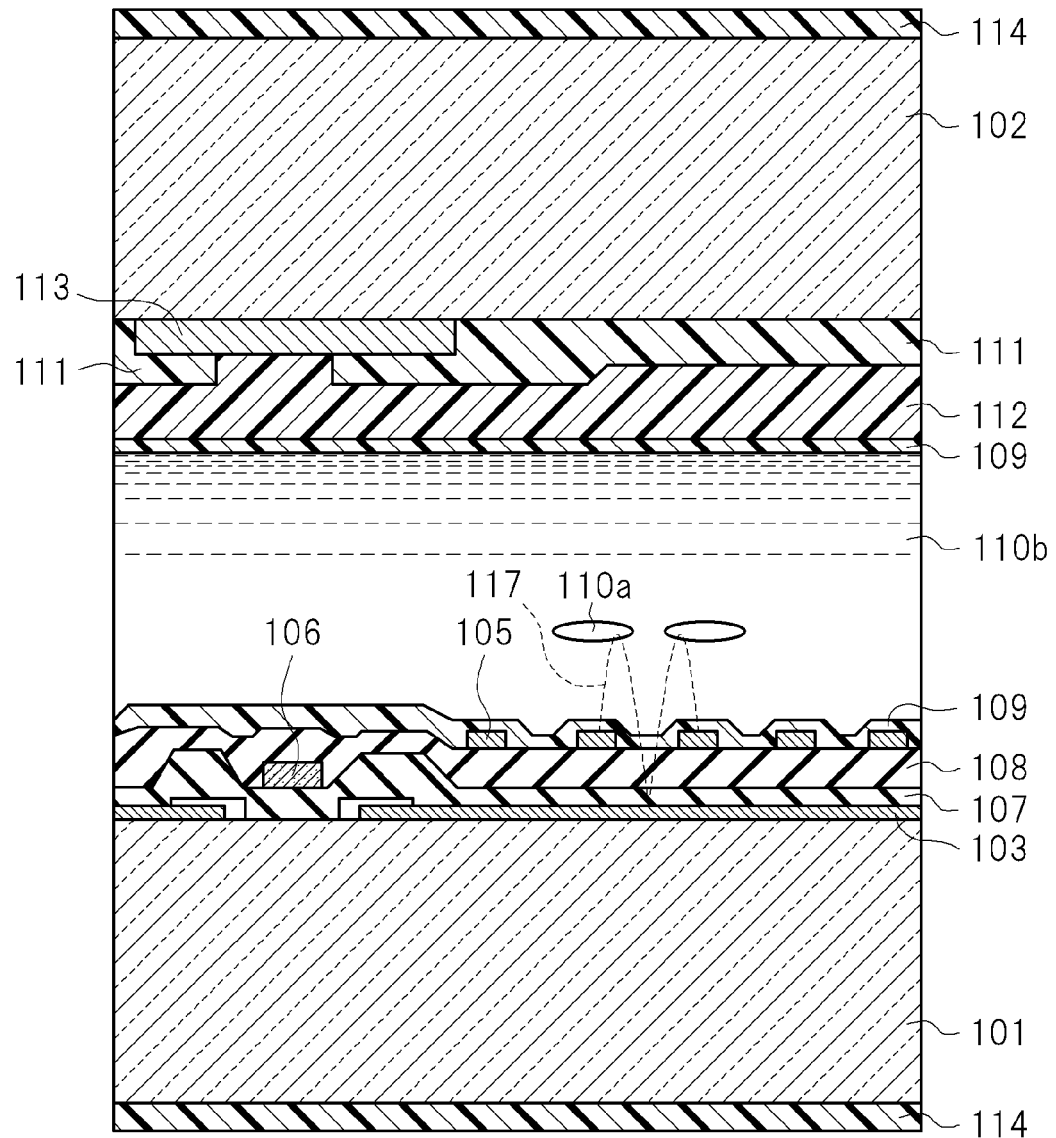
FIG. 7 is a schematic cross-sectional view of one pixel and the vicinity thereof of a liquid crystal display device according to a fifth embodiment.

FIG. 7 is a schematic cross-sectional view of one pixel and the vicinity thereof of a liquid crystal display device according to a fifth embodiment. In the drawing, the same symbols as those in the drawings illustrating the above-described respective embodiments correspond to the same functional portions. In this embodiment, the pixel electrode 105 and the common electrode 103 are made of ITO, and the common electrode 103 is formed of a solid electrode that covers substantially the entire pixel. According to this configuration, a portion above the electrode can be also used as a transmission portion so that the aperture ratio can be improved. Further, the distance between electrodes can be shortened, and therefore, the electric field can be efficiently applied to the liquid crystal.

Figure 8:
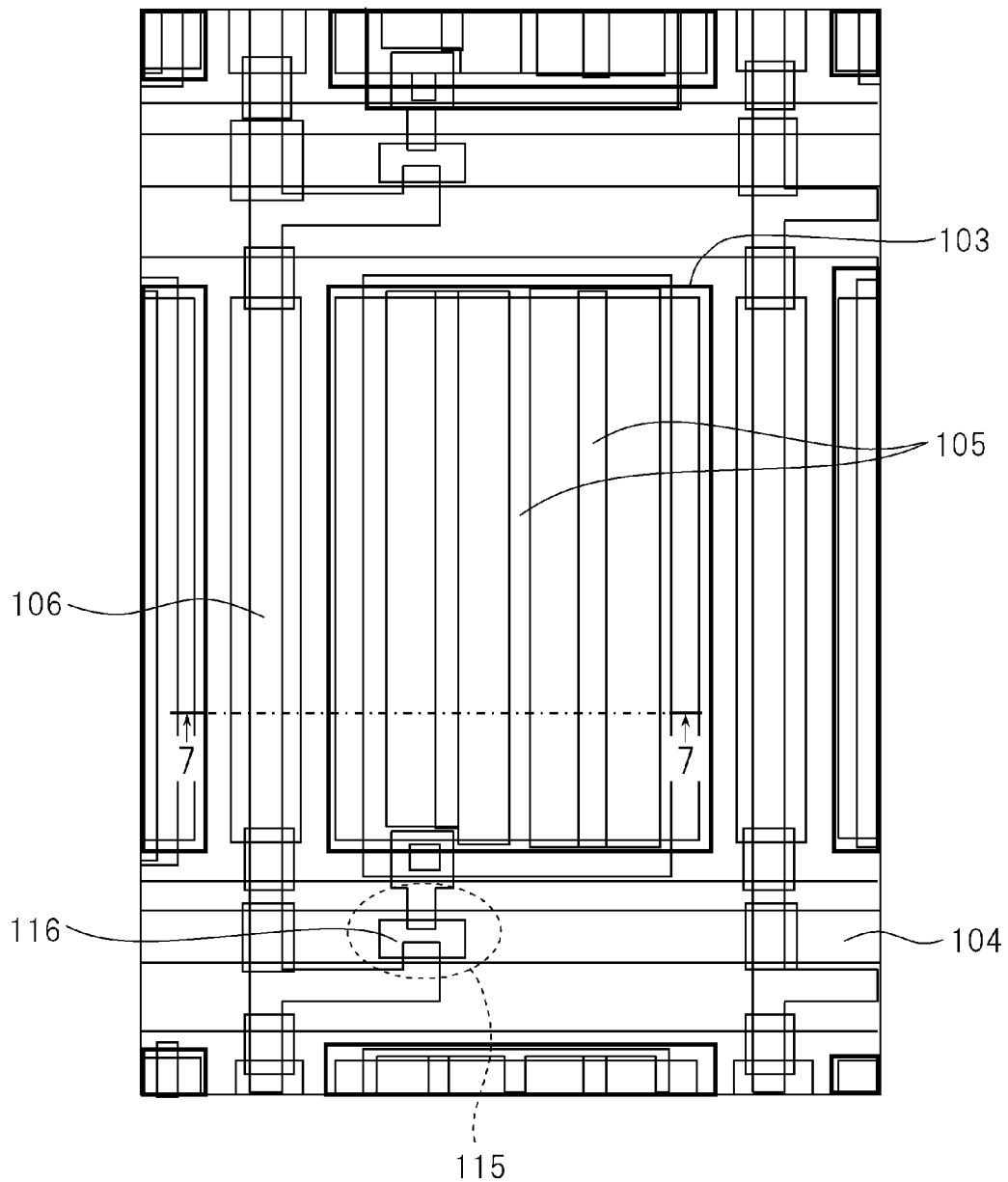
FIG. 8 is a schematic plan view of an active matrix substrate illustrating the structure of one pixel and the vicinity thereof of the liquid crystal display device according to the fifth embodiment.

FIG. 8 is a schematic plan view of an active matrix substrate illustrating the structure of one pixel and the vicinity thereof of the liquid crystal display device according to the fifth embodiment. FIG. 8 illustrates the structures of the thin-film transistor 115, the common electrode 103, the pixel electrode 105, and the signal line 106.

In a method for producing the liquid crystal display device according to this embodiment, as the glass substrate 101, a surface-polished glass substrate having a thickness of 0.7 mm is used. On the glass substrate 101, the gate insulating film 107 for preventing the common electrode 103, the pixel electrode 105, the signal line 106, and the scan line 104 from being short-circuited, and the protective insulating film 108 for protecting the thin-film transistor 115, the pixel electrode 105, and the signal line 106 are formed, thereby providing a TFT substrate.

The thin-film transistor 115 is composed of the pixel electrode (source electrode) 105, the signal line (drain electrode) 106, the scan line (gate electrode) 104, and the semiconductor film 116 made of amorphous silicon. The scan line 104 was formed by patterning an aluminum film, the signal line (drain electrode) 106 was formed by patterning a chromium film, and the common electrode 103 and the pixel electrode 105 were formed by patterning ITO.

The gate insulating film 107 and the protective insulating film 108 were made of silicon nitride, and the film thicknesses thereof were set to 0.2 μm and 0.3 μm, respectively. A capacitance element was formed as a structure in which the gate insulating film 107 and the protective insulating film 108 were sandwiched between the pixel electrode 105 and the common electrode 103.

The pixel electrode 105 was disposed so as to overlap the upper layer of the common electrode 103 having a solid shape. The number of pixels formed by 1024×3 (corresponding to R, G, and B) signal lines 106 and 768 scan lines 104 is 1024×3∴768.

On the glass substrate 102, in the same manner as in the first embodiment, the color filter layer 111 with the black matrix 113 was formed, thereby providing a counter color filter substrate.

In this embodiment, each alignment film material in which a polyamide acid methyl ester obtained using 1,4-phenylenediamine (PDA) and 1,3-dimethyl-1,2,3,4-cyclobutane tetracarboxylic dianhydride as starting materials was mixed with each of a variety of polyamide acids synthesized according to a starting material composition shown in the following Table 5A at a ratio of 5:5 was prepared to form the alignment control film 109. By using the alignment control film 109, a liquid crystal display device was produced. A varnish containing 5 wt % of the resin component, 60 wt % of DMAC, 20 wt % of γ-butyrolactone, and 15 wt % of butyl cellosolve was prepared and a film was formed by printing the varnish on the active matrix substrate, followed by a heat treatment to effect imidization, whereby the alignment control film 109, which is dense and composed of a polyimide, a polyamide acid ester, and a polyamide acid, and has an imidization ratio of about 95% or more and a film thickness of about 100 nm, was formed.

TABLE 5A

| Alignment film | First diamine component | (mol %) | Second diamine component | (mol %) | Diamine component | (mol %) | Acid dianhydride component | (mol %) |
|---|---|---|---|---|---|---|---|---|
| Alignment film 1 | A-1 | 40 | B-3 | 60 | — | — | BuDA | 100 |
| Alignment film 2 | A-1 | 50 | B-7 (n = 3) | 50 | — | — | BuDA | 100 |
| Alignment film 3 | A-5 | 60 | B-7 (n = 8) | 40 | — | — | BuDA | 100 |
| Alignment film 4 | A-9 (n = 3) | 30 | B-8 | 70 | — | — | BuDA | 100 |
| Alignment film 5 | A-11 (n = 3) | 70 | B-8 | 30 | — | — | BuDA | 100 |
| Alignment film 6 | A-6 | 20 | B-16 (n = 3) | 80 | — | — | BuDA | 100 |
| Alignment film 7 | A-16 | 30 | B-17 (n = 4) | 70 | — | — | CBDA | 100 |
| Alignment film 8 | A-7 | 20 | B-15 | 80 | — | — | BuDA | 80 |
|  |  |  |  |  |  |  | PMDA | 20 |
| Alignment film 9 | A-1 | 40 | B-7 (n = 1) | 60 | — | — | DCHA | 100 |
| Alignment film 10 | A-12 | 50 | B-10 | 50 | — | — | PMDA | 100 |
| Alignment film 11 | A-8 | 10 | B-4 | 90 | — | — | CBDA | 100 |
| Alignment film 12 | A-1 | 70 | B-23 (n = 1) | 30 | — | — | BuDA | 70 |
|  |  |  |  |  |  |  | PMDA | 30 |
| Alignment film 13 | A-16 | 40 | B-24 (n = 2) | 60 | — | — | CHDA | 100 |
| Alignment film 14 | A-13 | 70 | B-25 | 30 | — | — | BuDA | 50 |
|  |  |  |  |  |  |  | PMDA | 50 |
| Alignment film 15 | A-15 | 60 | B-26 (n = 5) | 40 | — | — | BuDA | 50 |
|  |  |  |  |  |  |  | PMDA | 50 |
| Alignment film 16 | A-13 | 80 | B-27 | 20 | — | — | BuDA | 50 |
|  |  |  |  |  |  |  | PMDA | 50 |
| Alignment film 17 | A-1 | 70 | B-28 | 30 | — | — | BuDA | 50 |
|  |  |  |  |  |  |  | PMDA | 50 |
| Alignment film 18 | A-6 | 40 | B-10 | 40 | PDA | 20 | BuDA | 100 |
| Alignment film 19 | A-6 | 30 | B-10 | 30 | PDA | 40 | BuDA | 100 |
| Alignment film 20 | A-1 | 20 | B-18 | 80 | — | — | BuDA | 100 |
| Alignment film 21 | A-1 | 20 | B-21 (n = 1) | 80 | — | — | BuDA | 100 |
| Alignment film 22 | A-1 | 20 | B-22 (n = 1) | 80 | — | — | BuDA | 100 |

Similarly, the alignment control film 109 was formed also on the surface of the other glass substrate 102 having an ITO film formed thereon in the same manner.

An alignment treatment method was performed by irradiating the film with the same polarized ultraviolet light as that in the first embodiment at an irradiation energy of 1.5 J/cm$^2$.

The alignment directions of the alignment control films 109 on the TFT substrate and the color filter substrate were made substantially parallel with each other. Polymer beads having an average particle diameter of 4 μm were dispersed as a spacer between these substrates, and the liquid crystal molecules 110a were sandwiched between the TFT substrate and the color filter substrate. As the liquid crystal molecules 110a, the same liquid crystal composition A as that in the first embodiment was used.

The two polarizing plates 114 that sandwich the TFT substrate and the color filter substrate were arranged in a crossed nicol state. Then, a normally closed characteristic in which a dark state is given at a low voltage and a bright state is given at a high voltage was adopted.

The liquid crystal display devices and the alignment films were evaluated in the same manner as in the first embodiment. The results are shown in Table 5B.

TABLE 5B

| Alignment film | Afterimage disappearance time (min) | Transmittance Y (%) |
|---|---|---|
| Alignment film 1 | 3.8 | >99.0 |
| Alignment film 2 | 3.5 | >99.0 |
| Alignment film 3 | 4.2 | >99.0 |
| Alignment film 4 | 2.9 | >99.0 |
| Alignment film 5 | 1.9 | >99.0 |
| Alignment film 6 | 2.8 | >99.0 |
| Alignment film 7 | 3.8 | >99.0 |
| Alignment film 8 | 3.2 | >99.0 |
| Alignment film 9 | 3.7 | >99.0 |
| Alignment film 10 | 4.0 | 97.0 |
| Alignment film 11 | 12.0 | >99.0 |
| Alignment film 12 | 4.5 | 98.5 |
| Alignment film 13 | 3.2 | >99.0 |
| Alignment film 14 | 3.9 | 98.0 |
| Alignment film 15 | 4.1 | 98.0 |
| Alignment film 16 | 4.5 | 98.0 |
| Alignment film 17 | 4.2 | 98.0 |
| Alignment film 18 | 3.6 | >99.0 |
| Alignment film 19 | 4.7 | >99.0 |
| Alignment film 20 | 4.3 | >99.0 |
| Alignment film 21 | 4.5 | >99.0 |
| Alignment film 22 | 4.5 | >99.0 |

Sixth Embodiment

In this embodiment, a liquid crystal display device was produced in the same manner as in the fifth embodiment except for the alignment control film 109 to be used. In this embodiment, each of a variety of polyamide acid methyl esters synthesized according to a starting material composition shown in the following Table 6A was used in each alignment film material to form the alignment control film 109.

TABLE 6A

| Alignment film | First diamine component | (mol %) | Second diamine component | (mol %) | Diamine component | (mol %) | Acid dianhydride component | (mol %) |
|---|---|---|---|---|---|---|---|---|
| Alignment film 1 | A-1 | 10 | B-19 | 20 | PDA | 70 | C-1(Z:H, H, H, H) | 100 |
| Alignment film 2 | A-16 | 30 | B-24 (n = 1) | 20 | PDA | 50 | C-1(Z:$CH_3$, H, H, H) | 100 |
| Alignment film 3 | A-1 | 15 | B-6 (n = 0) | 15 | PDA | 70 | C-1(Z:$CH_3$, $CH_3$, H, H) | 100 |
| Alignment film 4 | A-6 | 20 | B-7 (n = 0) | 10 | PDA | 70 | C-1(Z:$CH_3$, $CH_3$, H, H) | 100 |
| Alignment film 5 | A-16 | 15 | B-1 | 15 | PDA | 70 | C-1(Z:$CH_3$, $CH_3$, H, H) | 100 |
| Alignment film 6 | A-1 | 30 | B-6 (n = 0) | 30 | PDA | 40 | C-1(Z:$CH_3$, $CH_3$, H, H) | 100 |
| Alignment film 7 | A-12 | 50 | B-13 | 50 | — | 0 | C-1(Z:$CH_3$, $CH_3$, H, H) | 100 |
| Alignment film 8 | A-10 (n = 1) | 60 | B-8 | 40 | — | 0 | C-1(Z:$CH_3$, $CH_3$, H, H) | 100 |
| Alignment film 9 | A-1 | 15 | 6-17 (n = 3) | 15 | PDA | 70 | C-1(Z:$CH_3$, $CH_3$, H, H) PMDA | 90 10 |
| Alignment film 10 | A-6 | 15 | B-12 | 15 | PDA | 70 | C-1(Z:$CH_3$, $CH_3$, H, H) PMDA | 80 20 |
| Alignment film 11 | A-7 | 15 | B-23 (n = 2) | 15 | PDA | 70 | C-1(Z:$CH_3$, $CH_3$, $CH_3$, $CH_3$) | 100 |
| Alignment film 12 | A-15 | 10 | B-13) | 20 | PDA | 70 | C-1(Z:$C_2H_5$, $C_2H_5$, H, H) | 100 |
| Alignment film 13 | A-17 | 10 | B-15 | 20 | PDA | 70 | C-1(Z:$C_8H_{17}$, H, H, H) | 100 |
| Alignment film 14 | A-18 | 20 | B-24 (n = 1) | 20 | PDA | 60 | C-1(Z:$CH_3$, $CH_3$, H, H) | 100 |
| Alignment film 15 | A-19 | 20 | B-24 (n = 1) | 20 | PDA | 60 | C-1(Z:$CH_3$, $CH_3$, H, H) | 100 |

The liquid crystal display devices and the alignment films were evaluated in the same manner as in the first embodiment. The results are shown in Table 6B.

TABLE 6B

| Alignment film | Afterimage disappearance time (min) | Transmittance Y (%) |
|---|---|---|
| Alignment film 1 | 4.2 | >99.0 |
| Alignment film 2 | 2.3 | >99.0 |
| Alignment film 3 | 4.3 | >99.0 |
| Alignment film 4 | 4.0 | >99.0 |
| Alignment film 5 | 3.9 | >99.0 |
| Alignment film 6 | 2.5 | >99.0 |
| Alignment film 7 | 1.8 | >99.0 |
| Alignment film 8 | 0.5 | >99.0 |
| Alignment film 9 | 4.6 | >99.0 |
| Alignment film 10 | 4.5 | >99.0 |
| Alignment film 11 | 4.6 | >99.0 |

TABLE 6B-continued

| Alignment film | Afterimage disappearance time (min) | Transmittance Y (%) |
|---|---|---|
| Alignment film 12 | 4.7 | >99.0 |
| Alignment film 13 | 4.3 | >99.0 |
| Alignment film 14 | 4.0 | >99.0 |
| Alignment film 15 | 3.8 | >99.0 |

Seventh Embodiment

In this embodiment, a liquid crystal display device was produced in the same manner as in the fifth embodiment except for the alignment control film 109 to be used. In this embodiment, each alignment film material in which a polyamide acid methyl ester obtained using 1,4-phenylenediamine (PDA) and 1,3-dimethyl-1,2,3,4-cyclobutane tetracarboxylic dianhydride as starting materials was mixed with each of a variety of polyamide acids synthesized according to a starting material composition shown in the following Table 7A at a ratio of 3:7 was prepared to form the alignment control film 109.

TABLE 7A

| Alignment film | First diamine component | (mol %) | Second diamine component | (mol %) | Acid dianhydride component | (mol %) |
|---|---|---|---|---|---|---|
| Alignment film 1 | A-1 | 30 | B-29 (R = $CH_3$, n = 0) | 70 | BuDA | 100 |
| Alignment film 2 | A-4 | 40 | B-30 (R = $CH_3$, n = 3) | 60 | BuDA | 100 |
| Alignment film 3 | A-5 | 40 | B-31 (R = $CH_3$, n = 3) | 60 | BuDA | 100 |
| Alignment film 4 | A-20 | 50 | B-32 (R = $CH_3$) | 50 | BuDA | 100 |
| Alignment film 5 | A-19 | 50 | B-33 (R = $CH_3$) | 50 | BuDA | 100 |
| Alignment film 6 | A-16 | 30 | B-34 (R = $CH_3$) | 70 | BuDA | 100 |
| Alignment film 7 | A-6 | 50 | B-35 (R = $CH_3$) | 50 | CHDA | 100 |
| Alignment film 8 | A-12 | 50 | B-36 (R = $CH_3$) | 50 | CHDA | 100 |
| Alignment film 9 | A-13 | 50 | B-37 (R = $CH_3$, n = 4) | 50 | CHDA | 100 |
| Alignment film 10 | A-14 | 50 | B-38 (R = $CH_3$, n = 4) | 50 | CHDA | 100 |

The liquid crystal display devices and the alignment films were evaluated in the same manner as in the first embodiment. The results are shown in Table 7B.

TABLE 7B

| Alignment film | Afterimage disappearance time (min) | Transmittance Y (%) |
|---|---|---|
| Alignment film 1 | 4.6 | >99.0 |
| Alignment film 2 | 4.6 | >99.0 |

TABLE 7B-continued

| Alignment film | Afterimage disappearance time (min) | Transmittance Y (%) |
|---|---|---|
| Alignment film 3 | 4.6 | >99.0 |
| Alignment film 4 | 4.5 | >99.0 |
| Alignment film 5 | 4.5 | >99.0 |
| Alignment film 6 | 4.4 | >99.0 |
| Alignment film 7 | 4.1 | >99.0 |
| Alignment film 8 | 4.2 | >99.0 |
| Alignment film 9 | 4.1 | >99.0 |
| Alignment film 10 | 4.1 | >99.0 |

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device comprising:
a first substrate and a second substrate, at least one of which is transparent;
a liquid crystal layer disposed between the first substrate and the second substrate;
a group of electrodes for applying an electric field to the liquid crystal layer, which is formed on at least one of the first substrate and the second substrate;
a plurality of active elements connected to the group of electrodes; and
an alignment film disposed on at least one of the first substrate and the second substrate, wherein
the alignment film contains a polyimide and a precursor of the polyimide, each of which is formed from a diamine and an acid anhydride,
the diamine contains a first diamine having at least one acidic group and a second diamine having at least one nitrogen atom-containing basic functional group other than two amino groups,
the second diamine is represented by the following chemical formula (2): $H_2N—Y—NH_2$, wherein Y is an at least divalent organic group which contains one to three nitrogen atoms, and contains a functional group selected from an amino group having a secondary amine structure (—NH—), a primary amide group (—CO—$NH_2$), and a secondary amide group (—CO—NH—) as the nitrogen atom-containing basic functional group, and
in a case where the second diamine has an annulation in the molecule, the annulation is a benzene ring structure, and
wherein the second diamine comprises at least one of the compounds represented by the following chemical formulae (B-7), (B-30) and (B-31):

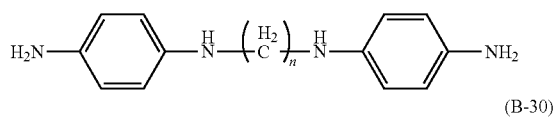
(B-7)

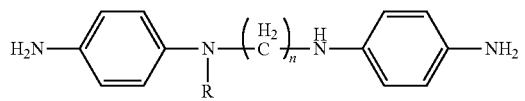
(B-30)

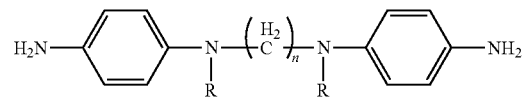
(B-31)

in which each n independently represents an integer of 0 to 8, and each R independently represents an alkyl group having 1 to 3 carbon atoms.

2. The liquid crystal display device according to claim 1, wherein the first diamine contains at least one functional group selected from a carboxylic acid group, a sulfonic acid group, a phosphoric acid group, and a phosphonic acid group as the acidic group.

3. The liquid crystal display device according to claim 1, wherein the first diamine is represented by the following chemical formula (1): $H_2N—X—NH_2$ (wherein X is an at least divalent organic group, and contains one to three functional groups of at least one kind selected from a carboxylic acid group, a sulfonic acid group, a phosphoric acid group, and a phosphonic acid group as the acidic group in the chemical structure thereof).

4. The liquid crystal display device according to claim 3, wherein the ratio of the number of nitrogen atoms derived from the nitrogen atom-containing functional group to the number of the acidic groups derived from the first diamine contained in the polyimide and the precursor of the polyimide constituting the alignment film is from 0.25 to 4.0.

5. The liquid crystal display device according to claim 3, wherein the sum of the content rate of the first diamine and the content rate of the second diamine in the diamine to be used for forming the polyimide and the precursor of the polyimide is 30 mol % or more.

6. The liquid crystal display device according to claim 1, wherein the acid anhydride to be used for forming the polyimide and the precursor of the polyimide contains an aliphatic acid dianhydride in an amount of 50 mol % or more.

7. The liquid crystal display device according to claim 1, wherein the transmittance (Y) of the alignment film is 98.0% or more.

8. The liquid crystal display device according to claim 1, wherein the alignment film is imparted a liquid crystal alignment ability by irradiation with polarized ultraviolet light.

9. The liquid crystal display device according to claim 1, wherein the precursor of the polyimide contains a polyamide acid ester and a polyamide acid.

10. The liquid crystal display device according to claim 9, wherein the polyamide acid ester is formed from a cyclobutane tetracarboxylic dianhydride derivative and an aromatic diamine.

11. The liquid crystal display device according to claim 1, wherein the precursor of the polyimide is a polyamide acid ester which is formed from a cyclobutane tetracarboxylic dianhydride derivative.

12. An alignment film comprising a polyimide and a precursor of the polyimide, each of which is formed from a diamine and an acid anhydride, and
liquid crystal molecules on a surface of the alignment film, uniformly aligned by the alignment film,
wherein
the diamine contains a first diamine having at least one acidic group and a second diamine having at least one nitrogen atom-containing basic functional group other than two amino groups, the second diamine is represented by the following chemical formula (2): H₂N—Y—NH₂, wherein Y is an at least divalent organic group which contains one to three nitrogen atoms, and contains a functional group selected from an amino group having a secondary amine structure (—NH—), a primary amide group (—CO—NH₂), and a secondary amide group (—CO—NH—) as the nitrogen atom-containing basic functional group, and in a case where the second diamine has an annulation in the molecule, the annulation is a benzene ring structure, and wherein the second diamine comprises at least one of the compounds represented by the following chemical formulae (B-7), (B-30) and (B-31):

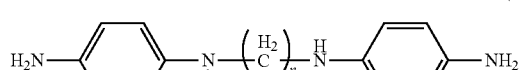
(B-7)

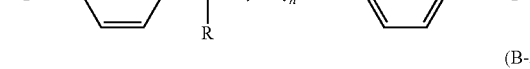
(B-30)

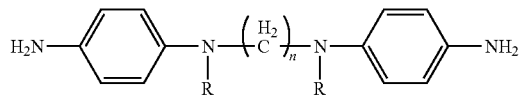
(B-31)

in which each n independently represents an integer of 0 to 8, and each R independently represents an alkyl group having 1 to 3 carbon atoms.

13. A liquid crystal display device comprising:

a first substrate and a second substrate, at least one of which is transparent;

a liquid crystal layer disposed between the first substrate and the second substrate;

a group of electrodes for applying an electric field to the liquid crystal layer, which is formed on at least one of the first substrate and the second substrate;

a plurality of active elements connected to the group of electrodes; and an alignment film disposed on at least one of the first substrate and the second substrate, wherein the alignment film contains a polyimide and a precursor of the polyimide, each of which is formed from a diamine and an acid anhydride, the diamine contains a first diamine having at least one acidic group and a second diamine having at least one nitrogen atom-containing basic functional group other than two amino groups, the first diamine contains at least one functional group selected form a sulfonic acid group, a phosphoric acid group, and a phosphonic acid group as the acidic group, the second diamine is represented by the following chemical formula (2): H₂N—Y—NH₂, wherein Y is an at least divalent organic group which contains one to three nitrogen atoms, and contains a functional group selected from an amino group having a secondary amine structure (—NH—), a primary amide group (—CO—NH₂), and a secondary amide group (—CO—NH—) as the nitrogen atom-containing basic functional group, and in a case where the second diamine has an annulation in the molecule, the annulation is a benzene ring structure, and wherein the second diamine comprises at least one of the compounds represented by the following chemical formulae (B-7), (B-30) and (B-31):

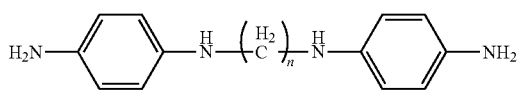
(B-7)

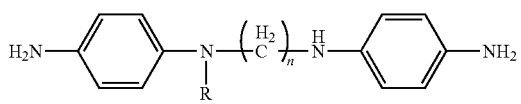
(B-30)

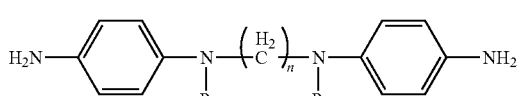
(B-31)

in which each n independently represents an integer of 0 to 8, and each R independently represents an alkyl group having 1 to 3 carbon atoms.

14. An alignment film comprising a polyimide and a precursor of the polyimide, each of which is formed from a diamine and an acid anhydride, and liquid crystal molecules on a surface of the alignment film, uniformly aligned by the alignment film, wherein the diamine contains a first diamine having at least one acidic group and a second diamine having at least one nitrogen atom-containing basic functional group other than two amino groups, the first diamine contains at least one functional group selected form a sulfonic acid group, a phosphoric acid group, and a phosphonic acid group as the acidic group, the second diamine is represented by the following chemical formula (2): N₂N—Y—NH₂, wherein Y is an at least divalent organic group which contains one to three nitrogen atoms; and contains a functional group selected from an amino group having a secondary amine structure (—NH—), primary amide group (—CO—NH₂), and a secondary amide group (—CO—NH—) as the nitrogen atom-containing basic functional group, and in a case where the second diamine has an annulation in the molecule, the annulation is a benzene ring structure, and wherein the second diamine comprises at least one of the compounds represented by the following chemical formulae (B-7), (B-30) and (B-31):

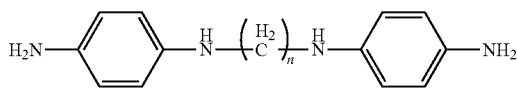
(B-7)

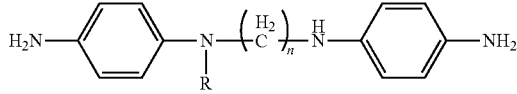
(B-30)

-continued
(B-31)
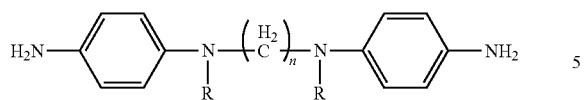
in which each n independently represents an integer of 0 to 8, and each R independently represents an alkyl group having 1 to 3 carbon atoms.
* * * * *